US012134272B2

(12) United States Patent
Wasamoto

(10) Patent No.: US 12,134,272 B2
(45) Date of Patent: Nov. 5, 2024

(54) LIQUID DISCHARGE APPARATUS

(71) Applicant: SEIKO EPSON CORPORATION, Tokyo (JP)

(72) Inventor: Tsuyoshi Wasamoto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 164 days.

(21) Appl. No.: 18/146,475

(22) Filed: Dec. 27, 2022

(65) Prior Publication Data

US 2023/0211606 A1 Jul. 6, 2023

(30) Foreign Application Priority Data

Dec. 28, 2021 (JP) ................................ 2021-213935

(51) Int. Cl.
*B41J 2/045* (2006.01)
*B41J 2/14* (2006.01)

(52) U.S. Cl.
CPC ....... *B41J 2/14088* (2013.01); *B41J 2/04563* (2013.01); *B41J 2/14072* (2013.01)

(58) Field of Classification Search
CPC ......................... B41J 2/04541; B41J 2/04563; B41J 2/04581; B41J 2/04588; B41J 2/04593; B41J 2/04596; B41J 2/14072; B41J 2/14088; B41J 2/14233; B41J 2002/14491
See application file for complete search history.

(56) References Cited

U.S. PATENT DOCUMENTS 10,293,604 B2 * 5/2019 Aoki .................... B41J 2/04528
2018/0345696 A1 * 12/2018 Kodaira ................. B41J 2/0457
2020/0130390 A1 * 4/2020 Kamijima .............. B41J 2/0458

FOREIGN PATENT DOCUMENTS

JP 2015-182291 A 10/2015

* cited by examiner

*Primary Examiner* — Anh T Vo
(74) *Attorney, Agent, or Firm* — Global IP Counselors, LLP

(57) ABSTRACT

There is provided a liquid discharge apparatus for forming an image on a medium by discharging a liquid, including: a first discharge head that discharges a liquid; and a first temperature indicating section provided in the first surface, in which the first temperature indicating section indicates that a temperature of the first temperature indicating section is lower than a first threshold value in a first state, and indicates that the temperature of the first temperature indicating section is equal to or higher than the first threshold value in a second state, and the first state and the second state change reversibly, and at least a part of the first temperature indicating section overlaps at least a part of the first propagation wiring in a normal direction of the wiring substrate.

13 Claims, 16 Drawing Sheets

| [SIH, SIL] | | [1, 1] LD | [1, 0] MD | [0, 1] SD | [0, 0] BSD |
|---|---|---|---|---|---|
| S1 | T1 | H | H | H | L |
| | T2 | H | L | L | L |
| S2 | T1 | L | L | L | H |
| | T2 | L | H | L | L |

LIQUID DISCHARGE APPARATUS

The present application is based on, and claims priority from JP Application Serial Number 2021-213935, filed Dec. 28, 2021, the disclosure of which is hereby incorporated by reference herein in its entirety.

BACKGROUND

1. Technical Field

The present disclosure relates to a liquid discharge apparatus.

2. Related Art

For a liquid discharge apparatus that discharges a liquid such as ink onto a medium, a technology that enables stable discharge characteristics by controlling the viscosity of the ink to be discharged, by adjusting the temperature of the ink, is known. For example, JP-A-2015-182291 discloses a technology that enables stable ink discharge by individually adjusting the temperature of ink for each type of ink in a liquid discharge apparatus capable of discharging a plurality of types of ink.

However, in a liquid discharge apparatus 1 having a heating element (heat exchange mechanism) for adjusting the temperature of the ink as described in JP-A-2015-182291, in the liquid discharge apparatus that supplies a large current to the heating element, heat generation in a propagation path through which the large current flows also increases. The technology described in JP-A-2015-182291 is not sufficient for the heat generated in the propagation path through which the large current flows, and there is room for improvement.

SUMMARY

According to an aspect of the present disclosure, there is provided a liquid discharge apparatus for forming an image on a medium by discharging a liquid, including: a first discharge head that discharges a liquid; a first liquid supply section that supplies a liquid to the first discharge head; a first heating element that is at least partially in contact with the first liquid supply section; a wiring substrate having a first surface, a second surface different from the first surface, and a first propagation wiring through which a first drive current supplied to the first heating element propagates; and a first temperature indicating section provided in the first surface, in which the first temperature indicating section indicates that a temperature of the first temperature indicating section is lower than a first threshold value in a first state, and indicates that the temperature of the first temperature indicating section is equal to or higher than the first threshold value in a second state, and the first state and the second state change reversibly, and at least a part of the first temperature indicating section overlaps at least a part of the first propagation wiring in a normal direction of the wiring substrate.

DESCRIPTION OF EXEMPLARY EMBODIMENTS

Figure 1:
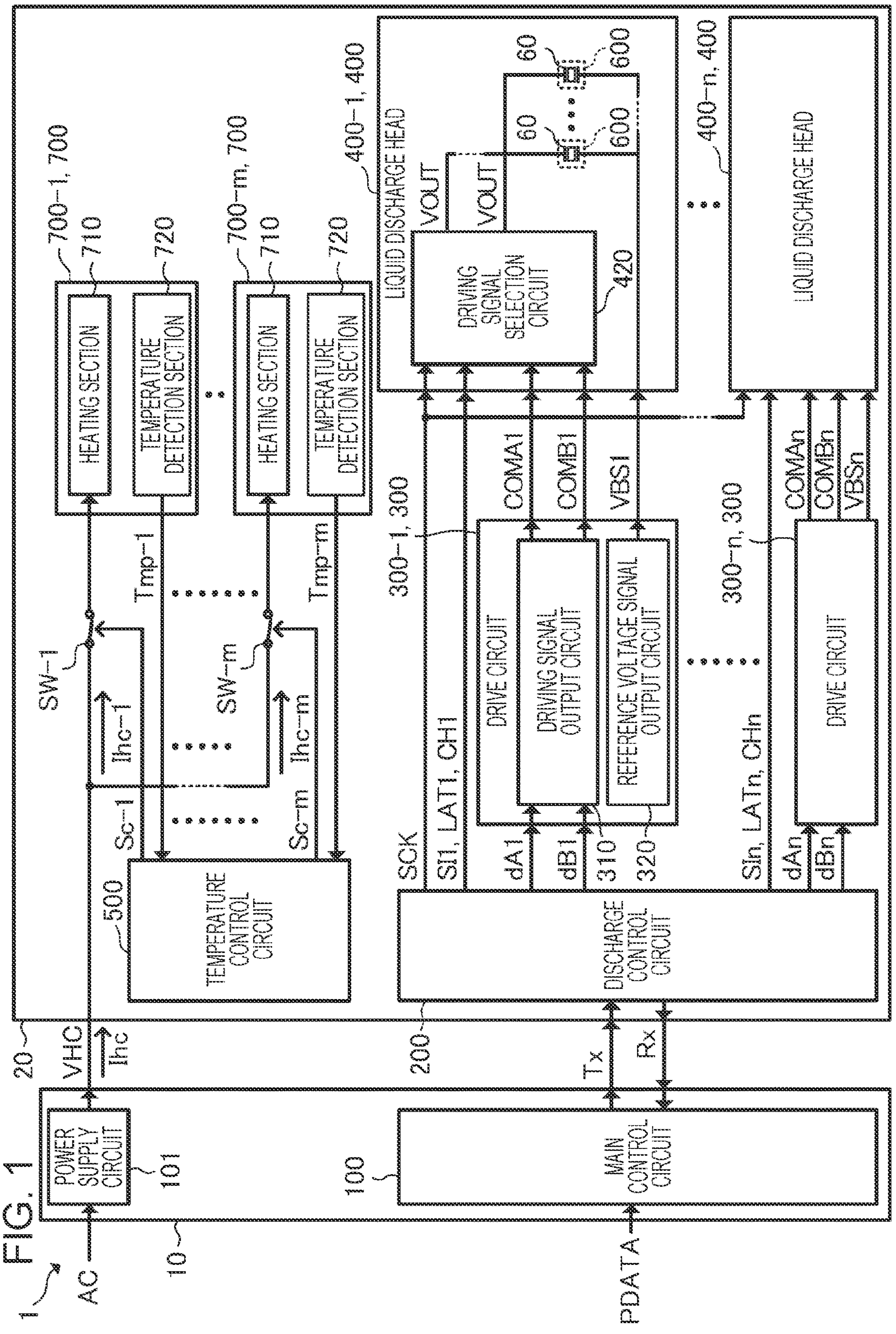
FIG. 1 is a view illustrating a functional configuration of a liquid discharge apparatus.

Hereinafter, appropriate embodiments of the present disclosure will be described with reference to the drawings. The drawing to be used is for convenience of description. In addition, the embodiments which will be described below do not inappropriately limit the contents of the present disclosure described in the claims. Moreover, not all of the configurations which will be described below are necessarily essential components of the present disclosure.

Further, a liquid discharge apparatus according to the present disclosure is a printing apparatus that discharges ink as an example of a liquid onto a recording medium, and will be described using a so-called ink jet printer as an example. The liquid discharge apparatus is not limited to ink jet printers, and may be a liquid discharge apparatus for discharging coloring materials used for manufacturing color filters of liquid crystal displays and the like, a liquid discharge apparatus for discharging electrode materials used for forming electrodes of organic EL displays, surface emitting displays, and the like, a liquid discharge apparatus for discharging bioorganic substances used in biochip manufacturing, and the like.

1. Functional Configuration of Liquid Discharge Apparatus

FIG. 1 is a view illustrating a functional configuration of a liquid discharge apparatus 1. The liquid discharge apparatus 1 in the present embodiment is a so-called serial ink jet printer that transports a recording medium on which an image is formed along the transport direction, and forms a desired image on the recording medium as a carriage mounted with a liquid discharge head 400 for discharging ink onto the recording medium reciprocates along the main scanning direction intersecting the transport direction. In addition, the liquid discharge apparatus 1 of the present embodiment will be described as a so-called textile printer that uses a cloth as a recording medium and forms a desired image on the cloth. The recording medium used in the liquid discharge apparatus 1 is not limited to a cloth, and may be paper or the like.

As illustrated in FIG. 1, the liquid discharge apparatus 1 includes a control unit 10 and the head unit 20.

The control unit 10 has a main control circuit 100 and a power supply circuit 101. The control unit 10 then controls the operation of the head unit 20.

A specific example of the operation of the control unit 10 will be described. An image signal PDATA is input to the main control circuit 100 from an external device such as a host computer (not illustrated). The main control circuit 100 performs various types of signal processing such as image processing on the input image signal PDATA. Then, the main control circuit 100 outputs to the head unit 20 a transmission signal Tx including the signal subjected to the signal processing.

Further, the main control circuit 100 generates various control signals for controlling each section of the liquid discharge apparatus 1, such as a control signal for controlling transport along the transport direction of the recording medium, a control signal for controlling movement along the main scanning direction of the carriage (which will be described later), or the like, and outputs the control signals to the corresponding configuration.

A commercial AC voltage AC is supplied to the power supply circuit 101 from a commercial power source (not illustrated) or the like. The power supply circuit 101 AC/DC-converts the supplied commercial AC voltage AC to generate a voltage signal VHC having a predetermined voltage value. This voltage signal VHC is a DC voltage of 24 V, for example, and is supplied to the head unit 20. In addition, the power supply circuit 101 may generate a DC voltage with a voltage value of 42 V, 7.5 V, 5 V, 3.3 V, and the like from the supplied commercial AC voltage AC. Various DC voltages generated by the power supply circuit 101 are used as power supply voltages for each component of the liquid discharge apparatus 1. That is, the power supply circuit 101 generates a DC voltage used as a power supply voltage for each component of the liquid discharge apparatus 1 from the commercial AC voltage AC supplied to the liquid discharge apparatus 1, and supplies the DC voltage to each section of the liquid discharge apparatus 1. Note that the power supply circuit 101 may have a plurality of AC/DC converter circuits that generate various DC voltages, and DC voltages having a plurality of voltage values may be generated by converting a voltage value of the DC voltage generated by one AC/DC conversion using a DC/DC converter circuit. Here, in the following description, the current flowing based on the voltage signal VHC output by the power supply circuit 101 may be referred to as heating current Ihc. That is, the liquid discharge apparatus 1 includes the power supply circuit 101 that outputs the heating current Ihc.

As described above, the control unit 10 generates the transmission signal Tx and the voltage signal VHC based on the image signal PDATA and the commercial AC voltage AC, and outputs the signals to each section of the liquid discharge apparatus 1 including the head unit 20. Accordingly, the control unit 10 controls the operation of the head unit 20.

The head unit 20 includes a discharge control circuit 200, drive circuits 300-1 to **300-*n*, liquid discharge heads 400-1 to 400-*n*, a temperature control circuit 500, ink heating sections 700-1 to 700-*m*, and switches SW-1 to SW-m. Then, the head unit 20 controls the discharge timing for discharging the ink and the discharge amount of the ink based on the transmission signal Tx output by the control unit 10**. Thereby, a desired image is formed on the recording medium.

Here, the drive circuits 300-1 to **300-*n* all have the same configuration, and when there is no need to distinguish between the drive circuits, the drive circuits are simply referred to as a drive circuit 300. The liquid discharge heads 400-1 to 400-*n* all have the same configuration, and when there is no need to distinguish between the liquid discharge heads, the liquid discharge heads are simply referred to as a liquid discharge head 400. The ink heating sections 700-1 to 700-*m* all have the same configuration, and when there is no need to distinguish between the ink heating sections, the ink heating sections are simply referred to as an ink heating section 700. The switches SW-1** to SW-m all have the same configuration, and when there is no need to distinguish between the switches, the switches are simply referred to as a switch SW.

A specific example of the operation of the head unit 20 will be described. The transmission signal Tx is input to the discharge control circuit 200 included in the head unit 20. When the transmission signal Tx is input, the discharge control circuit 200 generates a reception signal Rx indicating that the transmission signal Tx has been received, and outputs the reception signal Rx to the main control circuit 100. From the viewpoint of enabling high-speed communication with the control unit 10, differential signals of low voltage differential signaling (LVDS) can be used for such transmission signal Tx and reception signal Rx. Further, the transmission signal Tx and the reception signal Rx are not limited to electric signals, and may be optical signals, or both electric signals and optical signals may be used.

Further, the discharge control circuit 200 generates a clock signal SCK, print data signals SI1 to SIn, latch signals LAT1 to LATn, change signals CH1 to CHn, and reference driving signals dA1 to dAn and dB1 to dBn based on the input transmission signal Tx.

The reference driving signals dA1 to dAn and dB1 to dBn output by the discharge control circuit 200 are input to the drive circuits 300-1 to **300-*n***.

The drive circuit 300-1 includes a driving signal output circuit 310 and a reference voltage signal output circuit 320. The reference driving signals dA1 and dB1 output by the discharge control circuit 200 are input to the driving signal output circuit 310 included in the drive circuit 300-1. The driving signal output circuit 310 converts the input reference driving signal dA1 from digital to analog, and then class D-amplifies the converted analog signal to generate a driving signal COMA1, and converts the input reference driving signal dB1 from digital to analog, and then class D-amplifies the converted analog signal to generate a driving signal COMB1. That is, the driving signal output circuit 310 includes two class D amplifier circuits, a class D amplifier circuit that generates the driving signal COMA1 based on the reference driving signal dA1 and a class D amplifier circuit that generates the driving signal COMB1 based on the reference driving signal dB1. The driving signal output circuit 310 included in the drive circuit 300 outputs the generated driving signals COMA1 and COMB1 to the liquid discharge head 400-1. The driving signal output circuit 310 may include a class A amplifier circuit, a class B amplifier circuit, or a class AB amplifier circuit instead of or in addition to the class D amplifier circuit.

The reference voltage signal output circuit 320 included in the drive circuit 300-1 generates a reference voltage signal VBS1 and outputs the reference voltage signal VBS1 to the liquid discharge head 400-1. The reference voltage signal VBS1 may be, for example, a signal having a ground potential, or a DC voltage signal having a voltage value of 5.5 V or 6 V.

Here, as described above, the drive circuits 300-1 to **300-*n* all have the same configuration. In the following description, it is described that reference driving signals dAi and dBi are input to the drive circuit 300-*i* (i=any of 1 to n), and the drive circuit 300-*i* generates driving signals COMAi and COMBi and a reference voltage signal VBSi and outputs the signals to the liquid discharge head 400-*i***.

The liquid discharge heads 400-1 to **400-*n* include piezoelectric elements 60 driven based on the driving signals COMA1 to COMAn and COMB1 to COMBn, and the piezoelectric elements 60** are driven to discharge ink onto a recording medium.

The liquid discharge head 400-1 has a driving signal selection circuit 420 and p discharge sections 600. The clock signal SCK, the print data signal SI1, the latch signal LAT1, and the change signal CH1 which are output by the discharge control circuit 200, and the driving signals COMA1 and COMB1 and the reference voltage signal VBS1 which are output by the drive circuit 300-1, are input to the liquid discharge head 400-1. Then, the liquid discharge head 400-1 switches whether or not to supply the driving signals COMA1 and COMB1 to the piezoelectric element 60 at the timing defined by the input clock signal SCK, print data signal SI1, latch signal LAT1, and change signal CH1. As a result, the driving of the piezoelectric element 60 is controlled, and the amount of ink discharged from the discharge section 600 including the piezoelectric element 60 is controlled.

Specifically, the driving signal selection circuit 420 included in the liquid discharge head 400-1 includes, for example, an integrated circuit device. The print data signal SI1, the latch signal LAT1, the change signal CH1, the clock signal SCK, and the driving signals COMA1 and COMB1 are input to the driving signal selection circuit 420 included in the liquid discharge head 400-1. Then, the driving signal selection circuit 420 generates a driving signal VOUT by selecting or deselecting the driving signals COMA1 and COMB1 according to the print data signal SI1 at the timing defined by the latch signal LAT1 and change signal CH1. The driving signal VOUT generated by the driving signal selection circuit 420 is supplied to the p discharge sections 600 of the liquid discharge head 400-1.

Each of the p discharge sections 600 included in the liquid discharge head 400-1 includes a piezoelectric element 60. The driving signal VOUT output by the driving signal selection circuit 420 is supplied to one end of the piezoelectric element 60 included in each of the p discharge sections 600. The reference voltage signal VBS1 output from a reference voltage signal output circuit 320 included in the drive circuit 300-1 is supplied to the other end of the piezoelectric element 60 included in each of the p discharge sections 600. Then, the piezoelectric element 60 included in the discharge section 600 is driven according to the potential difference between the driving signal VOUT supplied to one end and the reference voltage signal VBS1 supplied to the other end. Accordingly, the ink having an amount that corresponds to the driving of the piezoelectric element 60 is discharged from the corresponding discharge section 600.

Here, as described above, the liquid discharge heads 400-1 to **400-*n* all have the same configuration. In other words, a print data signal SIi, a latch signal LATi, a change signal CHi, the clock signal SCK, and the driving signals COMAi and COMBi are input to the liquid discharge head 400-*i*. Then, the driving signal selection circuit 420 included in the liquid discharge head 400-*i* selects or deselects the driving signals COMAi and COMBi based on the print data signal SIi, the latch signal LATi, the change signal CHi, and the clock signal SCK to generate the driving signal VOUT. Then, the driving signal VOUT generated by the driving signal selection circuit 420 included in the liquid discharge head 400-*i* is supplied to one end of the piezoelectric element 60 included in each of the p discharge sections 600 of the liquid discharge head 400-*i*. The reference voltage signal VBSi is supplied to the other end of the piezoelectric element 60 included in each of the p discharge sections 600 of the liquid discharge head 400-*i*. Then, the piezoelectric elements 60 included in the p discharge sections 600 of the liquid discharge head 400-*i* are driven based on the potential difference between the driving signal VOUT supplied to one end and the reference voltage signal VBSi supplied to the other end, and the ink having an amount corresponding to the driving is discharged from the corresponding discharge section 600**.

Each of the ink heating sections 700-1 to **700-*m* has a heating section 710 and a temperature detection section 720**.

The voltage signal VHC is supplied to the heating section 710 included in the ink heating section 700-1 via the switch SW-1. That is, a heating current Ihc-1 in the heating current Ihc based on the voltage signal VHC output from the power supply circuit 101 is supplied to the heating section 710 included in the ink heating section 700-1 via the switch SW-1. As a result, the heating section 710 included in the ink heating section 700-1 generates heat by the heating current Ihc-1. The temperature detection section 720 included in the ink heating section 700-1 detects the temperature of the heating section 710 included in the ink heating section 700-1 and outputs the temperature to the temperature control circuit 500 as a temperature detection signal Tmp-1.

Similarly, a heating current Ihc-j in the heating current Ihc based on the voltage signal VHC output from the power supply circuit 101 is supplied to the heating section 710 included in the ink heating section **700-*j* (j=any of 1 to m) via a switch SW-j. As a result, the heating section 710 included in the ink heating section 700-*j* generates heat by the heating current Ihc-j. The temperature detection section 720 included in the ink heating section 700-*j* detects the temperature of the heating section 710 included in the ink heating section 700-*j*, and outputs the temperature to the temperature control circuit 500** as a temperature detection signal Tmp-j.

The temperature detection signals Tmp-1 to Tmp-m output from the temperature detection sections 720 included in each of the ink heating sections 700-1 to **700-*m* are input to the temperature control circuit 500. The temperature control circuit 500 generates switch control signals Sc-1 to Sc-m for controlling each of the switches SW-1 to SW-m, based on the input temperature detection signals Tmp-1 to Tmp-m, and outputs the signals to the corresponding switches SW-1** to SW-m.

Specifically, the temperature control circuit 500 detects the temperature of the heating section 710 included in the ink heating section 700-1 based on the temperature detection signal Tmp-1 output by the temperature detection section 720 included in the ink heating section 700-1. When the temperature of the heating section 710 included in the ink heating section 700-1 is lower than the assumed temperature, the temperature control circuit 500 generates the switch control signal Sc-1 for controlling the switch SW-1 to increase the amount of the heating current Ihc-1 flowing to the switch SW-1, and outputs the signal to the switch SW-1. On the other hand, when the temperature of the heating section 710 included in the ink heating section 700-1 is higher than the assumed temperature, the temperature control circuit 500 generates the switch control signal Sc-1 for controlling the switch SW-1 to decrease the amount of the heating current Ihc-1 flowing to the switch SW-1, and outputs the signal to the switch SW-1. Thereby, the temperature of the heating section 710 included in the ink heating section 700-1 is controlled.

Similarly, the temperature control circuit 500 detects the temperature of the heating section 710 included in the ink heating section 700-*j* based on the temperature detection signal Tmp-j output by the temperature detection section 720 included in the ink heating section 700-*j*. In addition, when the temperature of the heating section 710 included in the ink heating section 700-*j* is lower than the assumed temperature, the temperature control circuit 500 generates the switch control signal Sc-j for controlling the switch SW-j to increase the amount of the heating current Ihc-j flowing to the switch SW-j, and outputs the signal to the switch SW-j. On the other hand, when the temperature of the heating section 710 included in the ink heating section 700-*j* is higher than the assumed temperature, the temperature control circuit 500 generates the switch control signal Sc-j for controlling the switch SW-j to decrease the amount of the heating current Ihc-j flowing to the switch SW-j, and outputs the signal to the switch SW-j. As a result, the temperature of the heating section 710 included in the ink heating section 700-*j* is controlled to a predetermined value.

Here, as the switches SW-1 to SW-m, bipolar transistors capable of controlling the conduction state between a collector terminal and an emitter terminal according to the amount of current supplied to a base terminal, a MOSFET capable of controlling the conduction state between a drain terminal and a source terminal according to the amount of current supplied to the gate terminal, or the like can be used.

Here, in the following description, it is described that the temperature detection section 720 included in the ink heating section 700 outputs a temperature detection signal Tmp to the temperature control circuit 500 as the temperature detection result of the heating section 710 included in the ink heating section 700. That is, in the following description, the temperature detection signals Tmp-1 to Tmp-m may be referred to as the temperature detection signal Tmp when there is no need to distinguish between the temperature detection signals.

As described above, in the liquid discharge apparatus 1 of the present embodiment, the control unit 10 controls the transport of the recording medium according to the input image signal PDATA, generates the transmission signal Tx, and outputs the transmission signal Tx to the head unit 20. Then, the head unit 20 controls the discharge of ink from the liquid discharge heads 400-1 to 400-*n* based on the transmission signal Tx. As a result, a predetermined amount of ink lands on a desired position on the recording medium, forming a desired dot on the recording medium.

Further, in the liquid discharge apparatus 1 of the present embodiment, the head unit 20 has the temperature control circuit 500 for controlling the temperature of ink, and the ink heating sections 700-1 to 700-*m*. Physical properties such as viscosity of the ink used in the liquid discharge apparatus 1 may change depending on temperature. In the liquid discharge apparatus 1 of the present embodiment, the temperature of the ink flowing inside the liquid discharge apparatus 1 can be kept substantially constant by the temperature control circuit 500 and the ink heating sections 700-1 to 700-*m*. As a result, the physical properties such as the viscosity of the ink flowing inside the liquid discharge apparatus 1 are stabilized, and as a result, the discharge accuracy of the ink in the liquid discharge apparatus 1 can be improved.

2. Configuration and Operation of Liquid Discharge Head

Next, a configuration of the liquid discharge head 400 will be described. In describing the configuration of the liquid discharge head 400, it is described that the print data signal SI among the print data signals SI1 to SIn, the latch signal LAT among the latch signals LAT1 to LATn, the change signal CH among the change signals CH1 to CHn, the clock signal SCK, the driving signal COMA among the driving signals COMA1 to COMAn, the driving signal COMB among the driving signals COMB1 to COMBn, and the reference voltage signal VBS among the reference voltage signals VBS1 to VBSn are input to the liquid discharge head 400.

Figure 2:
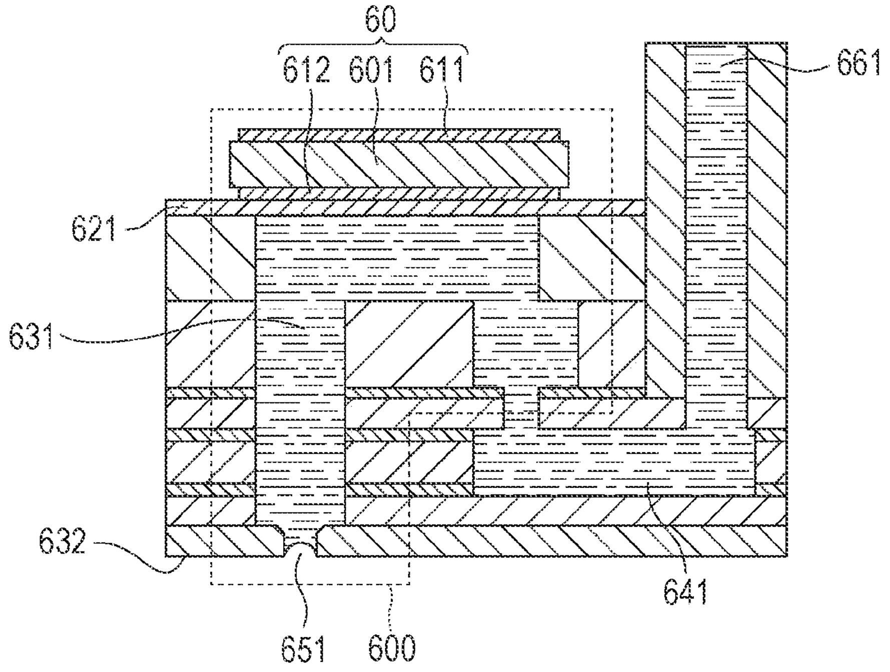
FIG. 2 is a view for explaining a schematic structure of a discharge section.

First, the structure of p discharge sections 600 included in the liquid discharge head 400 will be described. FIG. 2 is a view for explaining the schematic structure of one discharge section 600 among the p discharge sections 600. In addition, FIG. 2 also illustrates a reservoir 641 and a supply port 661 in addition to the discharge section 600.

As illustrated in FIG. 2, the discharge section 600 includes the piezoelectric element 60, a vibrating plate 621, a cavity 631, and a nozzle plate 632. Further, the piezoelectric element 60 includes a piezoelectric body 601 and electrodes 611 and 612. The piezoelectric element 60 is configured such that the electrodes 611 and 612 are positioned to sandwich the piezoelectric body 601. The piezoelectric element 60 configured as described above is driven such that the center part is displaced in the up-down direction according to the potential difference between the voltage supplied to the electrode 611 and the voltage supplied to the electrode 612.

Specifically, the electrode 611 of the piezoelectric element 60 is supplied with the driving signal VOUT based on the driving signals COMA and COMB, and the reference voltage signal VBS is supplied to the electrode 612 of the piezoelectric element 60. As the voltage value of the driving signal VOUT supplied to the electrode 611 changes, the potential difference between the electrode 611 supplied with the driving signal VOUT and the electrode 612 supplied with the reference voltage signal VBS changes. As a result, the piezoelectric element 60 is driven such that the center part is displaced in the up-down direction.

The vibrating plate 621 is positioned below the piezoelectric element 60 in FIG. 2. In other words, the piezoelectric element 60 is formed on the upper surface of the vibrating plate 621 in FIG. 2. The vibrating plate 621 deforms in the up-down direction as the piezoelectric element 60 is driven in the up-down direction.

A cavity 631 is positioned below the vibrating plate 621 in FIG. 2. Ink is supplied to the cavity 631 from the reservoir 641 provided in common to the plurality of discharge sections 600. Ink stored in an ink container (not illustrated) is introduced into the reservoir 641 via the supply port 661. That is, the ink stored in the ink container is branched in the reservoir 641 and supplied to the inside of the cavity 631. As a result, the inside of the cavity 631 is filled with ink. The internal volume of the cavity 631 expands or contracts as the vibrating plate 621 is displaced in the up-down direction. That is, the vibrating plate 621 functions as a diaphragm that changes the internal volume of the cavity 631, and the cavity 631 functions as a pressure chamber of which the pressure changes as the vibrating plate 621 is displaced in the up-down direction.

A nozzle 651 is formed on the nozzle plate 632. That is, the discharge section 600 includes the nozzle 651. The nozzle 651 is an opening portion which is provided on the nozzle plate 632 and communicates with the cavity 631. When the internal volume of the cavity 631 changes, the ink filled the inside of the cavity 631 is discharged from the nozzle 651 according to the change in the internal volume.

In the discharge section 600 configured as described above, when the piezoelectric element 60 is driven to bend in the upward direction, the vibrating plate 621 is displaced in the upward direction. Accordingly, the internal volume of the cavity 631 expands, and as a result, the ink stored in the reservoir 641 is drawn into the cavity 631. On the other hand, when the piezoelectric element 60 is driven to bend in the downward direction, the vibrating plate 621 is displaced in the downward direction. Accordingly, the internal volume of the cavity 631 contracts, and as a result, the ink having an amount corresponding to the degree of contraction of the internal volume of the cavity 631 is discharged from the nozzles 651.

The piezoelectric element 60 may be driven by being supplied with the driving signal VOUT corresponding to the driving signals COMA and COMB, and may not be limited to the structure illustrated in FIG. 2 as long as ink can be discharged from the nozzles 651 when the piezoelectric element 60 is driven.

Next, an example of the signal waveforms of the driving signals COMA and COMB output by the driving signal output circuit 310 and an example of the signal waveform of the driving signal VOUT output by the driving signal selection circuit 420 based on the driving signals COMA and COMB will be described.

Figure 3:
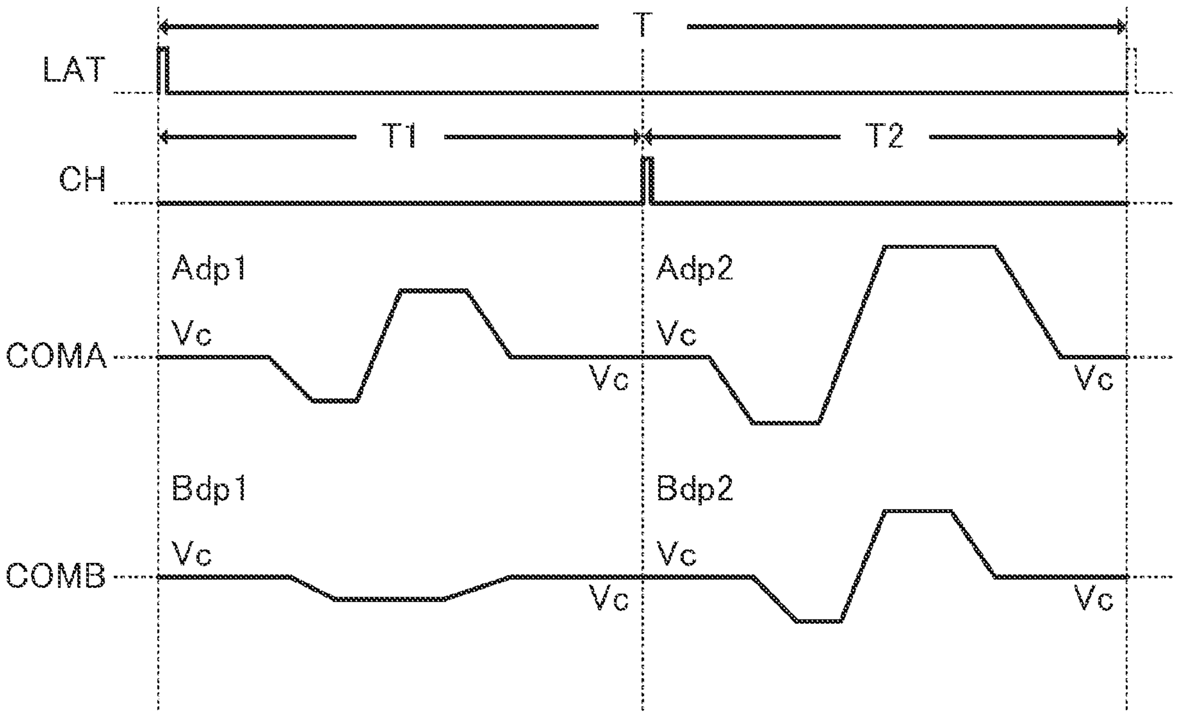
FIG. 3 is a view illustrating an example of signal waveforms of driving signals.

FIG. 3 is a view illustrating an example of the signal waveforms of the driving signals COMA and COMB. As illustrated in FIG. 3, the driving signal COMA has a trapezoidal waveform Adp1 disposed in a period T1 from the rise of the latch signal LAT to the rise of the change signal CH, and a trapezoidal waveform Adp2 disposed in a period T2 from the rise of the change signal CH to the rise of the latch signal LAT. In addition, when the trapezoidal waveform Adp1 is supplied to one end of the piezoelectric element 60, a predetermined amount of ink is discharged from the discharge section 600 that corresponds to the piezoelectric element 60, and the trapezoidal waveform Adp2 is supplied to one end of the piezoelectric element 60, an amount of ink larger than a predetermined amount is discharged from the discharge section 600 that corresponds to the piezoelectric element 60.

The driving signal COMB has a trapezoidal waveform Bdp1 disposed in the period T1 and a trapezoidal waveform Bdp2 disposed in the period T2. Even when the trapezoidal waveform Bdp1 is supplied to one end of the piezoelectric element 60, no ink is discharged from the discharge section 600 that corresponds to the piezoelectric element 60. The trapezoidal waveform Bdp1 is a signal waveform for vibrating the ink in the vicinity of the nozzle opening portion of the discharge section 600 to prevent an increase in ink viscosity. In addition, when the trapezoidal waveform Bdp2 is supplied to one end of the piezoelectric element 60, a predetermined amount of ink is discharged from the discharge section 600 that corresponds to the piezoelectric element 60 in the same manner as when the trapezoidal waveform Adp1 is supplied.

Here, both the voltages at each of the start timing and the end timing of the trapezoidal waveforms Adp1, Adp2, Bdp1, and Bdp2 are voltages Vc which are common signal waveforms. In other words, each of the trapezoidal waveforms Adp1, Adp2, Bdp1, and Bdp2 starts at the voltage Vc and ends at the voltage Vc.

Here, in the following description, when the trapezoidal waveform Adp1 is supplied to one end of the piezoelectric element 60, and when the trapezoidal waveform Bdp2 is supplied to one end of the piezoelectric element 60, a predetermined amount of ink discharged from the discharge section 600 that corresponds to the piezoelectric element 60 may be referred to as a small amount. When the trapezoidal waveform Adp2 is supplied to one end of the piezoelectric element 60, the amount of ink discharged from the discharge section 600 that corresponds to the piezoelectric element 60, which is larger than the predetermined amount, may be referred to as an intermediate amount. Further, when the trapezoidal waveform Bdp1 is supplied to one end of the piezoelectric element 60, the operation for vibrating the ink in the vicinity of the nozzle opening portion of the discharge section 600 that corresponds to the piezoelectric element 60 to prevent the ink viscosity from increasing may be referred to as micro-vibration BSD.

Although FIG. 3 illustrates a case where the trapezoidal waveform Adp1 and the trapezoidal waveform Bdp2 have signal waveforms having the same shape, the trapezoidal waveform Adp1 and the trapezoidal waveform Bdp2 may have different signal waveforms. In the following description, it is described that a small amount of ink is discharged from the corresponding discharge section 600 both when the trapezoidal waveform Adp1 is supplied to the piezoelectric element 60 and when the trapezoidal waveform Bdp2 is supplied to the piezoelectric element 60, but the present disclosure is not limited thereto. In other words, the signal waveforms of the driving signals COMA and COMB are not limited to the waveforms illustrated in FIG. 3, and signals of various waveform combinations may be used according to the nature of the discharged ink, the material of the recording medium, or the like.

Further, the drive circuits 300-1 to **300-*n* may output signal waveforms having different shapes. That is, the driving signals COMA1 to COMAn may include different signal waveforms, and the driving signals COMB1** to COMBn may include different signal waveforms.

Figure 4:
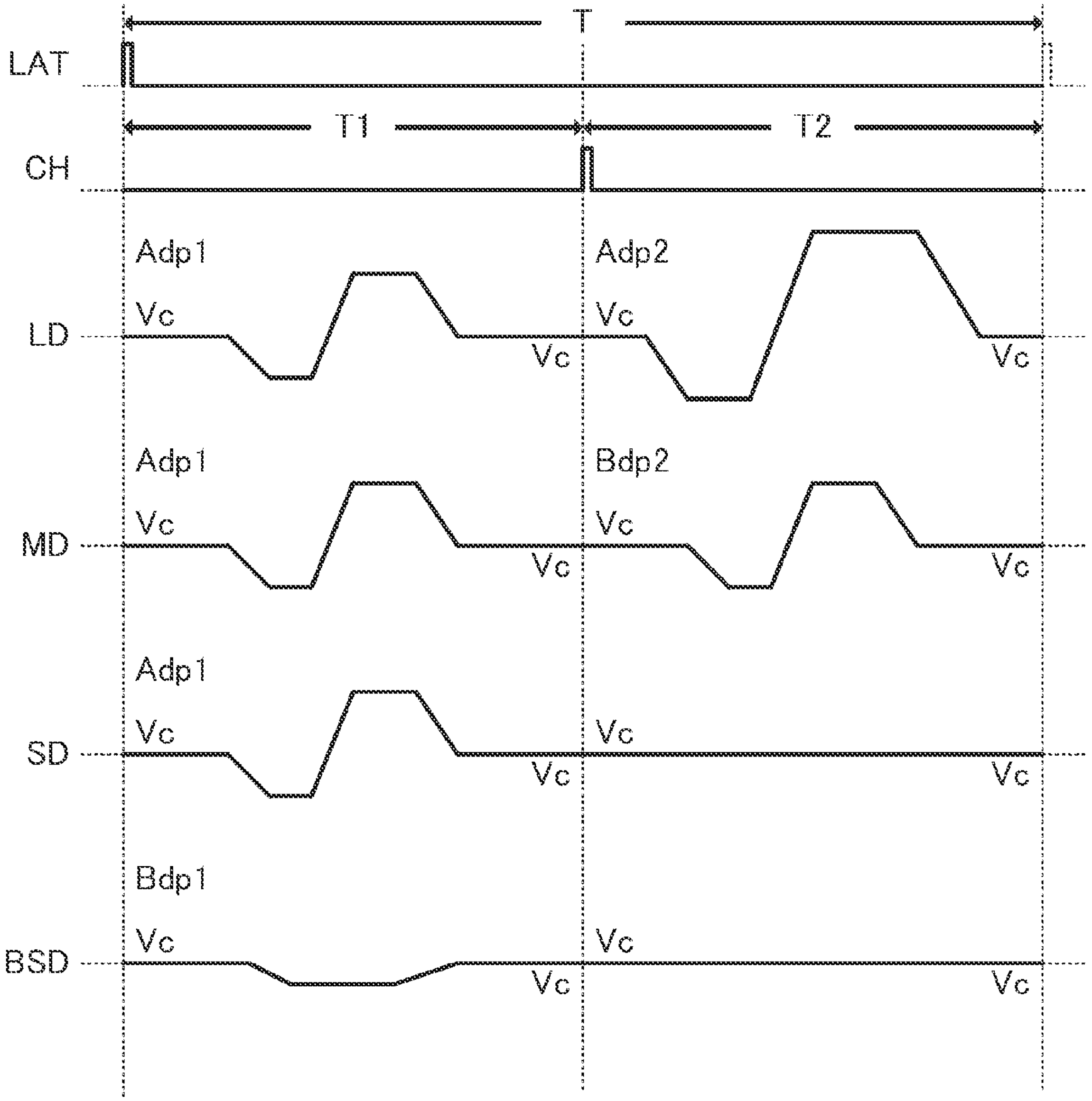
FIG. 4 is a view illustrating an example of a waveform of a driving signal.

FIG. 4 is a view illustrating an example of the waveform of the driving signal VOUT that corresponds to each of a "large dot LD", a "medium dot MD", a "small dot SD", and "micro-vibration BSD" which are formed on the recording medium.

As illustrated in FIG. 4, the driving signal VOUT for forming the "large dot LD" on the recording medium has a signal waveform in which the trapezoidal waveform Adp1 disposed in the period T1 and the trapezoidal waveform Adp2 disposed in the period T2 are continuous to each other. When the driving signal VOUT is supplied to one end of the piezoelectric element 60, a small amount of ink and a medium amount of ink are discharged from the discharge section 600 that corresponds to the piezoelectric element 60. Therefore, each ink lands on the recording medium and coalesces to form the large dots LD.

The driving signal VOUT for forming the "medium dot MD" on the recording medium has a signal waveform in which the trapezoidal waveform Adp1 disposed in the period T1 and the trapezoidal waveform Bdp2 disposed in the period T2 are continuous to each other. When the driving signal VOUT is supplied to one end of the piezoelectric element 60, a small amount of ink is discharged two times from the discharge section 600 that corresponds to the piezoelectric element 60. Then, each ink lands on the recording medium and coalesces to form the "medium dot MD" smaller than the large dot LD on the recording medium.

The driving signal VOUT for forming the "small dot SD" on the recording medium has a signal waveform in which the trapezoidal waveform Adp1 disposed in the period T1 and a waveform in which the voltage value disposed in the period T2 is the voltage Vc and is constant are continuous to each other. When the driving signal VOUT is supplied to one end of the piezoelectric element 60, a small amount of ink is discharged one time from the discharge section 600 that corresponds to the piezoelectric element 60. When the discharged ink lands on the recording medium, the small dots SD smaller than the medium dots MD are formed on the recording medium.

The driving signal VOUT that corresponds to the "micro-vibration BSD" has a signal waveform in which the trapezoidal waveform Bdp1 disposed in the period T1 and a waveform in which the voltage value disposed in the period T2 is the voltage Vc and is constant are continuous to each other. When the driving signal VOUT is supplied to one end of the piezoelectric element 60, the ink in the vicinity of the nozzle opening portion of the discharge section 600 that corresponds to the piezoelectric element 60 vibrates only, and no ink is discharged from the discharge section 600. Therefore, no ink lands on the recording medium and no dot is formed on the recording medium.

Here, in the waveform in which the voltage value included in the driving signal VOUT is the voltage Vc and is constant, when the driving signal selection circuit 420 selects none of the trapezoidal waveforms Adp1, Adp2, Bdp1, and Bdp2 as the driving signal VOUT, a waveform which is obtained when a waveform in which the voltage value supplied to the piezoelectric element 60 immediately before is the voltage Vc and is constant is held by the capacitance component of the piezoelectric element 60.

As described above, the liquid discharge apparatus 1 of the present embodiment forms dots on the recording medium by combining the ink discharged during the period T1 and the ink discharged during the period T2 in a cycle T. The cycle T including the period T1 and the period T2 corresponds to a dot formation cycle for forming dots on the recording medium.

Figure 5:
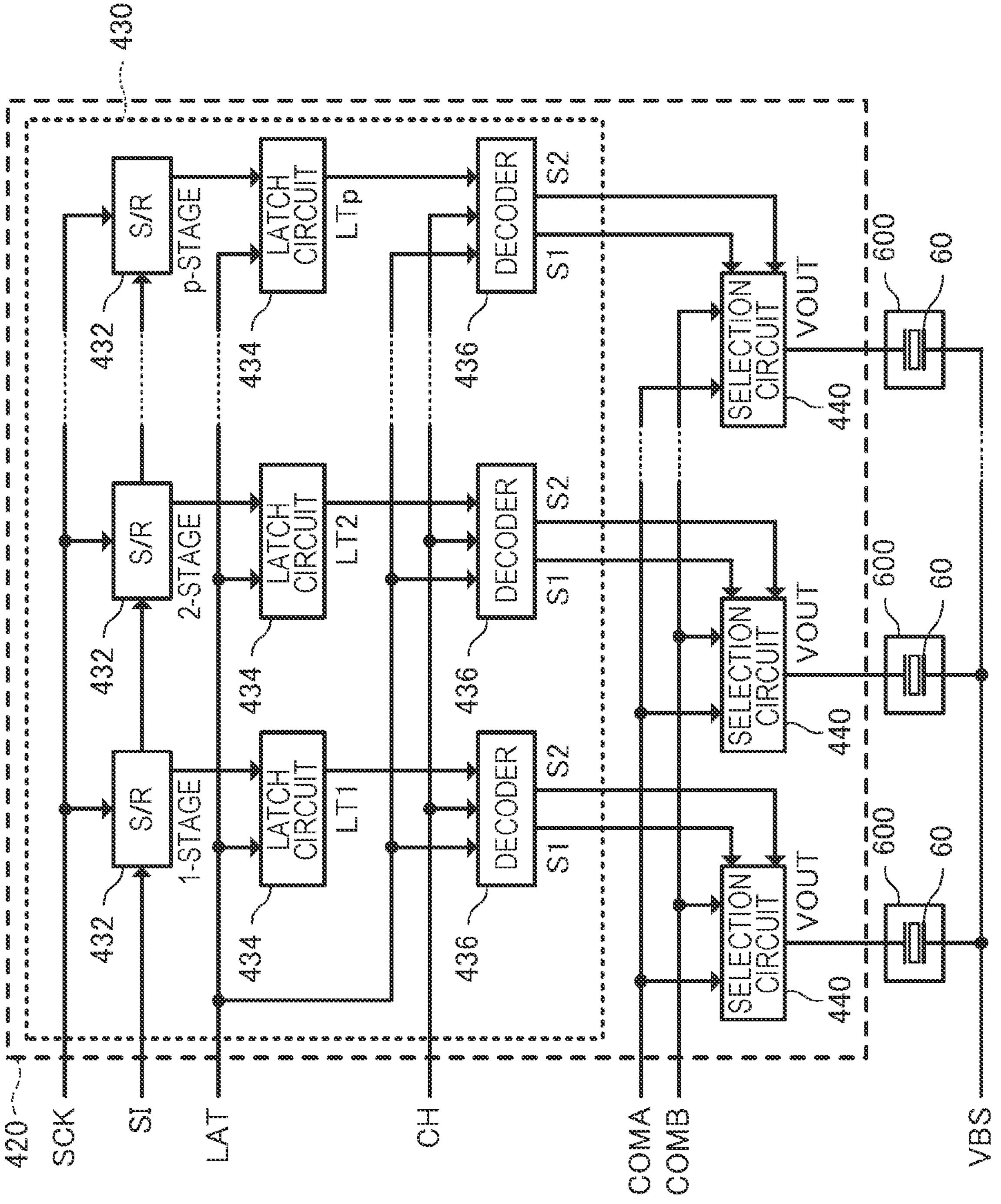
FIG. 5 is a view illustrating a configuration of a driving signal selection circuit.

Next, the configuration and operation of the driving signal selection circuit 420 that outputs the driving signal VOUT illustrated in FIG. 4 by selecting or deselecting the driving signal COMA and the driving signal COMB will be described. FIG. 5 is a view illustrating the configuration of the driving signal selection circuit 420. As illustrated in FIG. 5, the driving signal selection circuit 420 includes a selection control circuit 430 and p selection circuits 440.

The print data signal SI, the latch signal LAT, the change signal CH, and the clock signal SCK, which are output by the discharge control circuit 200, are input to the selection control circuit 430. In the selection control circuit 430, sets of a shift register (S/R) 432, a latch circuit 434, and a decoder 436 are provided corresponding to each of p discharge sections 600. That is, the driving signal selection circuit 420 includes p shift registers 432, p latch circuits 434, and p decoders 436.

The print data signal SI is input to the selection control circuit 430 in synchronization with the clock signal SCK. The print data signals SI are 2-bit print data [SIH, SIL] for selecting one of "large dot LD", "medium dot MD", "small dot SD", and "micro-vibration BSD", serially corresponding to each of the p discharge sections 600. That is, the print data signal SI is a 2p-bit signal. The print data [SIH, SIL] included in the print data signal SI is held in the p shift registers 432 that corresponds to the p discharge sections 600. Specifically, p stages of the shift register 432 corresponding to the discharge sections 600 are continuously coupled to each other, and the serially input print data signals SI are sequentially transferred to the subsequent stage among p stages of the shift register 432, which are continuously coupled to each other, in accordance with the clock signal SCK. When the print data [SIH, SIL] is held in the corresponding shift register 432, the clock signal SCK is stopped. In other words, by stopping the supply of the clock signal SCK, the print data [SIH, SIL] included in the print data signal SI is held in the corresponding shift register 432. In FIG. 5, in order to distinguish the shift registers 432 from each other, the shift registers 432 are denoted as 1-stage, 2-stage, . . . , and p-stage in order from the upstream to which the print data signal SI is input.

Figures 6, 7:
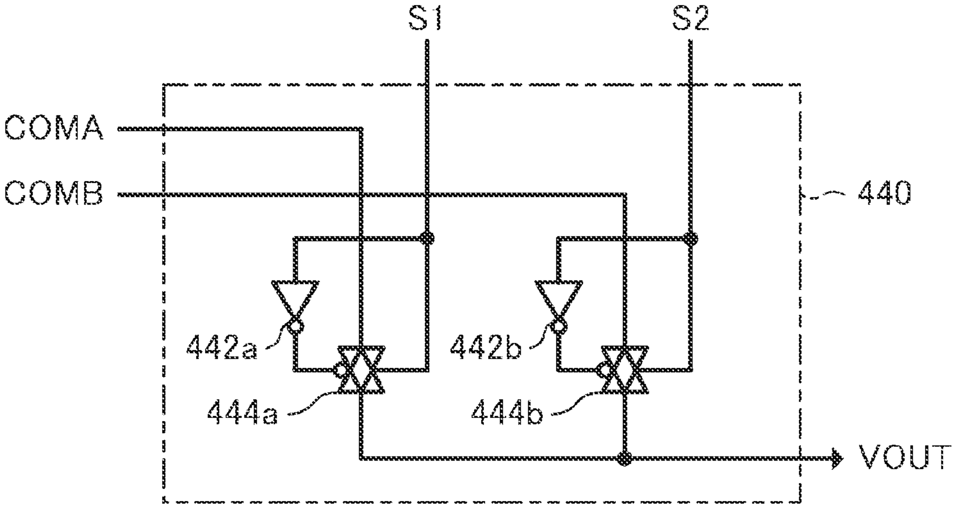
FIG. 6 is a view illustrating an example of decoding contents in a decoder.
FIG. 7 is a view illustrating a configuration of a selection circuit.

Each of the p latch circuits 434 latches the print data [SIH, SIL] held in each of the p shift registers 432 all at once at the rise of the latch signal LAT. The print data [SIH, SIL] latched by the latch circuit 434 is input to the corresponding decoder 436. FIG. 6 is a view illustrating an example of decoding contents in the decoder 436. The decoder 436 outputs logic level selection signals S1 and S2 according to the print data [SIH, SIL] latched in each of the periods T1 and T2. For example, when the input print data [SIH, SIL] is [1, 0], the decoder 436 outputs the logic level of the selection signal S1 as the H and L levels in the periods T1 and T2, and outputs the logic level of the selection signal S2 as the L and H levels in the periods T1 and T2.

The selection signals S1 and S2 output by the decoder 436 are input to the selection circuit 440. The selection circuit 440 is provided corresponding to each of the p discharge sections 600. In other words, the driving signal selection circuit 420 has p selection circuits 440 that are the same in number as the p discharge sections 600. FIG. 7 is a view illustrating a configuration of the selection circuit 440 that corresponds to one discharge section 600. As illustrated in FIG. 7, the selection circuit 440 has inverters 442*a* and 442*b*, which are NOT circuits, and transfer gates 444*a* and 444*b*.

While the selection signal S1 is input to a positive control end, which is not marked with a circle, at the transfer gate 444*a*, the logic level thereof is inverted by the inverter 442*a* and is input to a negative control end marked with a circle at the transfer gate 444*a*. The driving signal COMA is supplied to the input end of the transfer gate 444*a*. In addition, the transfer gate 444*a* conducts the input end and the output end to each other when the logic level of the selection signal S1 is the H level, and does not conduct the input end and the output end to each other when the logic level of the selection signal S1 is the L level. That is, the transfer gate 444*a* outputs the signal waveform included in the driving signal COMA from the output end when the logic level of the selection signal S1 is the H level, and does not output the signal waveform included in the driving signal COMA from the output end when the logic level of the selection signal S1 is the L level.

While the selection signal S2 is input to a positive control end, which is not marked with a circle, at the transfer gate 444*b*, the logic level of the selection signal S2 is inverted by the inverter 442*b* and is input to a negative control end marked with a circle at the transfer gate 444*b*. The driving signal COMB is supplied to the input end of the transfer gate 444*b*. In addition, the transfer gate 444*b* conducts the input end and the output end to each other when the logic level of the selection signal S2 is the H level, and does not conduct the input end and the output end to each other when the logic level of the selection signal S2 is the L level. That is, the transfer gate 444*b* outputs the signal waveform included in the driving signal COMB from the output end when the logic level of the selection signal S2 is the H level, and does not output the signal waveform included in the driving signal COMB from the output end when the logic level of the selection signal S2 is the L level.

The output ends of the transfer gates 444*a* and 444*b* configured as described above are commonly coupled in the selection circuit 440. The driving signal selection circuit 420 outputs the signals at the output ends of the transfer gates 444*a* and 444*b* commonly coupled in the selection circuit 440, as the driving signal VOUT.

Figure 8:
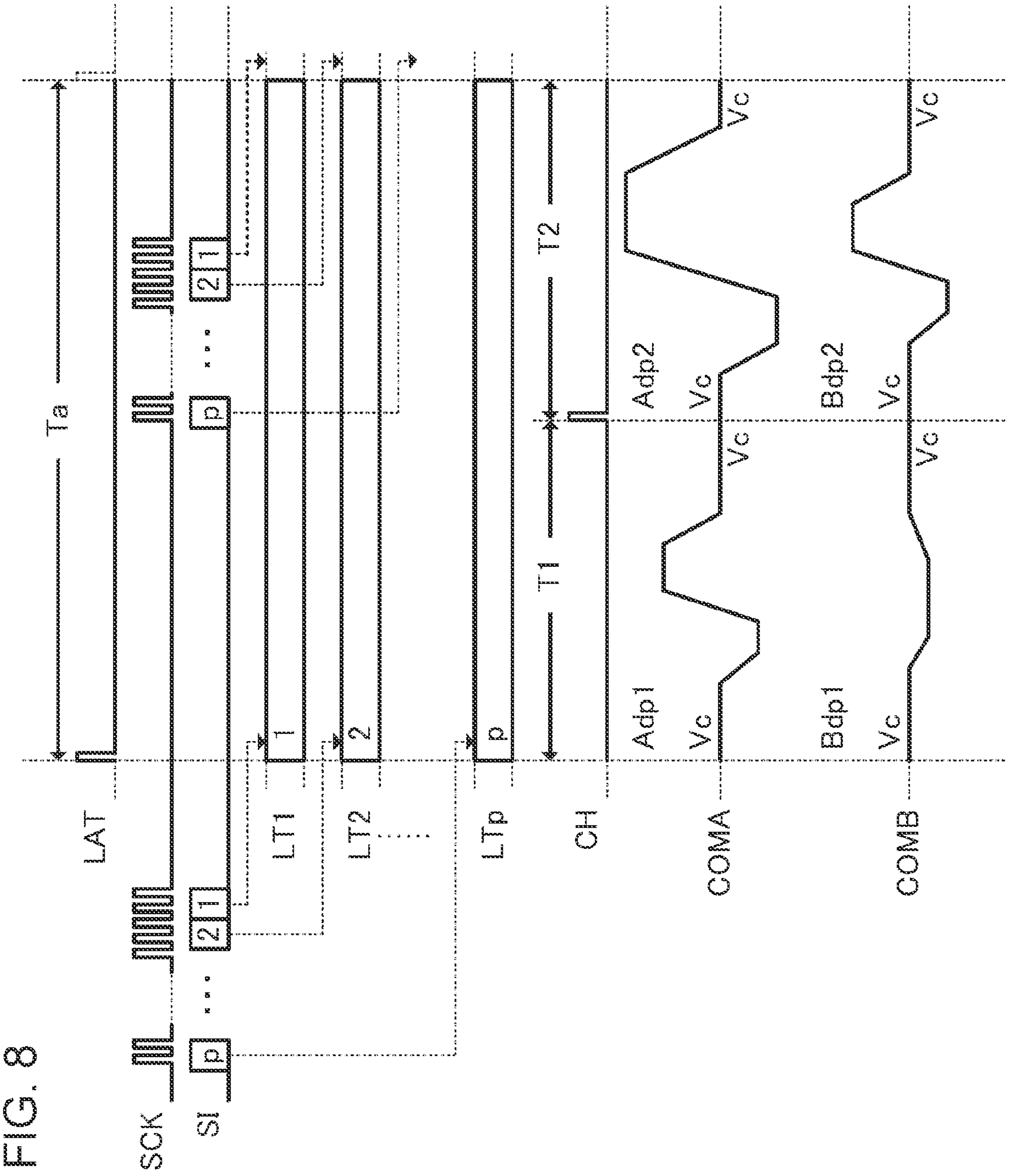
FIG. 8 is a view for explaining an operation of the driving signal selection circuit.

Here, the operation of the driving signal selection circuit 420 will be described with reference to FIG. 8. FIG. 8 is a view for explaining the operation of the driving signal selection circuit 420. The print data signal SI is serially input in synchronization with the clock signal SCK. In addition, the print data signals SI are sequentially transferred in the p shift registers 432 that correspond to the p discharge sections 600 in synchronization with the clock signal SCK. Then, when the input of the clock signal SCK is stopped, the print data [SIH, SIL] that corresponds to each of the p discharge sections 600 is held in the shift registers 432. The print data signal SI is input in order corresponding to the p-stage, . . . , 2-stage, and 1-stage discharge sections 600 of the shift register 432.

When the latch signal LAT rises, each of the latch circuits 434 latches the print data [SIH, SIL] held in the shift register 432 all at once. LT1, LT2, . . . , and LTp illustrated in FIG. 8 indicate the print data [SIH, SIL] latched by the latch circuits 434 that correspond to the 1-stage, 2-stage, . . . , and p-stage shift registers 432.

The decoder 436 outputs the logic levels of the selection signals S1 and S2 in each of the periods T1 and T2 with the contents illustrated in FIG. 6, according to the size of the dot defined by the latched print data [SIH, SIL]. The selection circuit 440 selects or deselects the signal waveforms included in the driving signals COMA and COMB according to the logic levels of the selection signals S1 and S2 output by the decoder 436, thereby generating the driving signal VOUT.

Specifically, when the print data [SIH, SIL]=[1, 1] is input to the decoder 436, the decoder 436 sets the logic level of the selection signal S1 to the H and H levels in the periods T1 and T2, and sets the logic level of the selection signal S2 to the L and L levels in the periods T1 and T2. Accordingly, the selection circuit 440 selects the trapezoidal waveform Adp1 in the period T1 and selects the trapezoidal waveform Adp2 in the period T2. As a result, the driving signal selection circuit 420 outputs the driving signal VOUT that corresponds to the "large dot LD" illustrated in FIG. 4.

In addition, when the print data [SIH, SIL]=[1, 0] is input to the decoder 436, the decoder 436 sets the logic level of the selection signal S1 to the H and L levels in the periods T1 and T2, and sets the logic level of the selection signal S2 to the L and H levels in the periods T1 and T2. Accordingly, the selection circuit 440 selects the trapezoidal waveform Adp1 in the period T1 and selects the trapezoidal waveform Bdp2 in the period T2. As a result, the driving signal selection circuit 420 outputs the driving signal VOUT that corresponds to the "medium dot MD" illustrated in FIG. 4.

In addition, when the print data [SIH, SIL]=[0, 1] is input to the decoder 436, the decoder 436 sets the logic level of the selection signal S1 to the H and L levels in the periods T1 and T2, and sets the logic level of the selection signal S2 to the L and L levels in the periods T1 and T2. Accordingly, the selection circuit 440 selects the trapezoidal waveform Adp1 in the period T1 and selects none of the trapezoidal waveforms Adp2 and Bdp2 in the period T2. As a result, the driving signal selection circuit 420 outputs the driving signal VOUT that corresponds to the "small dot SD" illustrated in FIG. 4.

In addition, when the print data [SIH, SIL]=[0, 0] is input to the decoder 436, the decoder 436 sets the logic level of the selection signal S1 to the L and L levels in the periods T1 and T2, and sets the logic level of the selection signal S2 to the H and L levels in the periods T1 and T2. Accordingly, the selection circuit 440 selects the trapezoidal waveform Bdp1 in the period T1 and selects none of the trapezoidal waveforms Adp2 and Bdp2 in the period T2. As a result, the driving signal selection circuit 420 outputs the driving signal VOUT that corresponds to the "micro-vibration BSD" illustrated in FIG. 4.

As described above, based on the input print data signal SI, latch signal LAT, change signal CH, and clock signal SCK, the driving signal selection circuit 420 selects or deselects the trapezoidal waveforms Adp1 and Adp2 included in the driving signal COMA and the trapezoidal waveforms Bdp1 and Bdp2 included in the driving signal COMB, to generate the driving signals VOUT that correspond to each of the "large dot LD", "medium dot MD", "small dot SD", and "micro-vibration BSD" that correspond to each of the p discharge sections 600, and output the signals to each of the p discharge sections 600.

3. Structure of Liquid Discharge Apparatus

Figure 9:
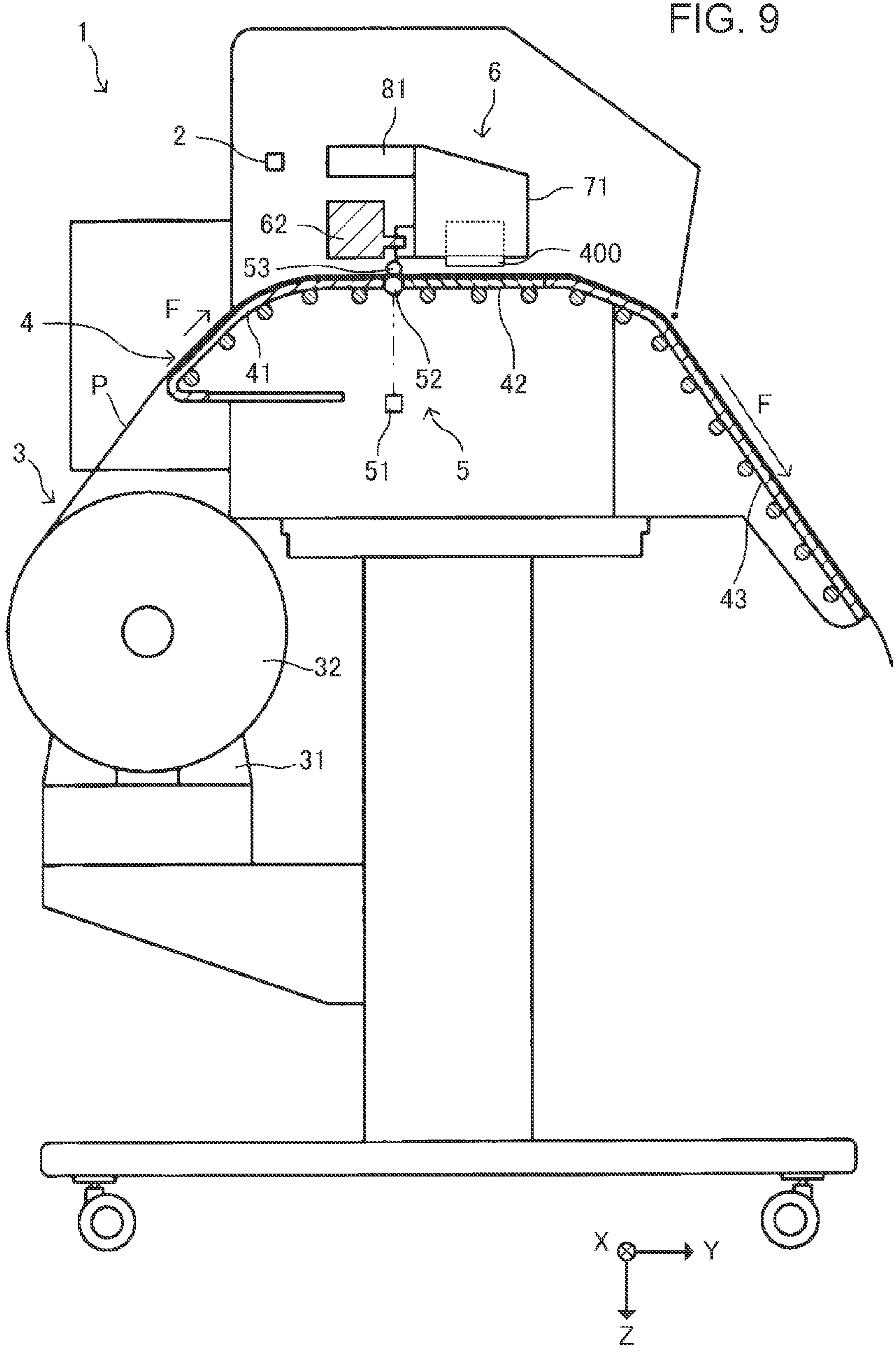
FIG. 9 is a view illustrating a structure of the liquid discharge apparatus when the liquid discharge apparatus is viewed from the side.

Next, the structure of the liquid discharge apparatus 1 will be described. FIG. 9 is a view illustrating a structure of the liquid discharge apparatus 1 when the liquid discharge apparatus 1 is viewed from the side. As illustrated in FIG. 9, the liquid discharge apparatus 1 includes a feeding section 3 that feeds a medium P as a recording medium, a support section 4 that supports the fed medium P, a transport section 5 that transports the medium P supported by the support section 4, the printing section 6 that performs printing on the medium P transported by the transport section 5, and a control section 2 that controls the operations of each section of the liquid discharge apparatus 1 including the feeding section 3, the support section 4, the transport section 5, and the printing section 6.

Here, in the following description, the width direction of the liquid discharge apparatus 1 and the main scanning direction of the liquid discharge apparatus 1 will be referred to as the X direction, the depth direction of the liquid discharge apparatus 1 will be referred to as the Y direction, the height direction of the liquid discharge apparatus 1 is referred to as the Z direction, and the direction in which the medium P is transported is referred to as a transport direction F. Further, the starting point side of the arrow indicating the X direction in the drawing may be referred to as the −X side, and the tip end side thereof may be referred to as the +X side. The starting point side of the arrow indicating the Y direction in the drawing may be referred to as the −Y side, the tip end side thereof may be referred to as the +Y side. The starting point side of the arrow indicating the Z direction in the drawing may be referred to as the −Z side, and the tip end side thereof may be referred to as the +Z side. In the following description, it is assumed that the X direction, the Y direction, and the Z direction are orthogonal to each other, but the components included in the liquid discharge apparatus 1 are not limited to being orthogonally disposed.

The control section 2 generates various signals for controlling each component of the liquid discharge apparatus 1 and outputs the signals to the corresponding components. The control section 2 includes the control unit 10 described above. The control section 2 is provided inside the outer shell of the liquid discharge apparatus 1, for example, in the vicinity of a coupling connector (not illustrated) to which a cable (not illustrated) for propagating the image signal PDATA input from an external device is attached, in the vicinity of a user interface (not illustrated) through which operation information of the liquid discharge apparatus 1 is input by a user, in the vicinity of a coupling connector (not illustrated) to which a cable (not illustrated) for propagating a commercial AC voltage AC supplied from a commercial power source or the like is attached, or the like. The control section 2 is not limited to a case of being configured with one substrate, and may be configured to include a plurality of substrates.

The feeding section 3 has a holding member 31. The holding member 31 rotatably holds the roll body 32 on which the medium P is wound. Then, the roll body 32 rotates in one direction under the control of the control section 2. As a result, the medium P wound around the roll body 32 is unwound and fed to the support section 4.

The support section 4 supports the medium P unwound from the roll body 32 and forms a transport path along which the medium P is transported. Specifically, the support section 4 has a first support section 41, a second support section 42 and a third support section 43. The first support section 41 supports the medium P fed out of the feeding section 3 and guides the medium P toward the second support section 42. The second support section 42 supports the medium P when the printing process is executed. The third support section 43 supports the medium P after the printing process is executed and guides the medium P downstream in the transport direction F.

The transport section 5 transports the medium P supported by the support section 4 along the transport path. The transport section 5 has a transport motor 51, a transport roller 52, and a driven roller 53. The transport motor 51 is rotationally driven under the control of the control section 2. The transport roller 52 is positioned on the +Z side of the transport path of the medium P and rotates according to the rotational drive of the transport motor 51. The driven roller 53 is positioned on the −Z side of the transport path of the medium P, and sandwiches the medium P transported along the transport path together with the transport roller 52. When the transport motor 51 is rotationally driven under the control of the control section 2, the transport roller 52 rotates, and the medium P sandwiched between the transport roller 52 and the driven roller 53 is transported along the transport direction F.

Figure 10:
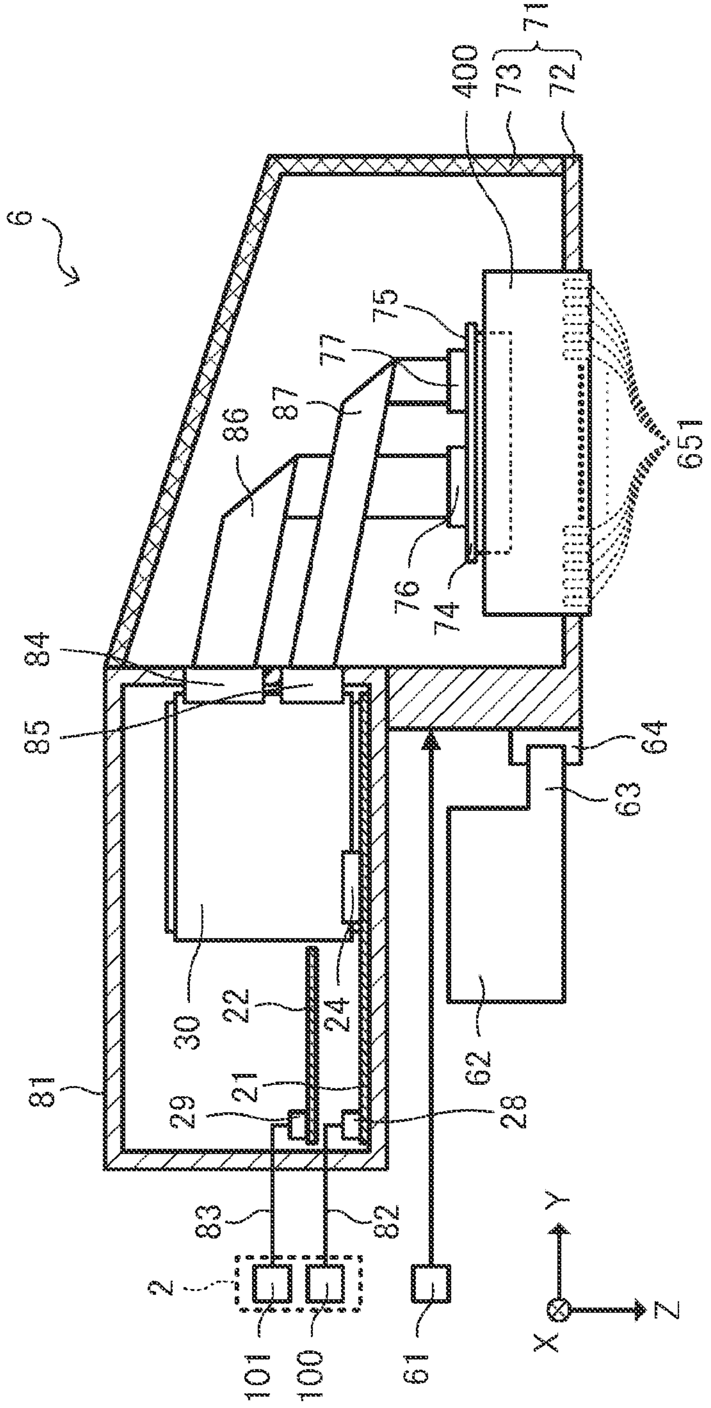
FIG. 10 is a side view illustrating a structure of a printing section of the liquid discharge apparatus.
Figure 11:
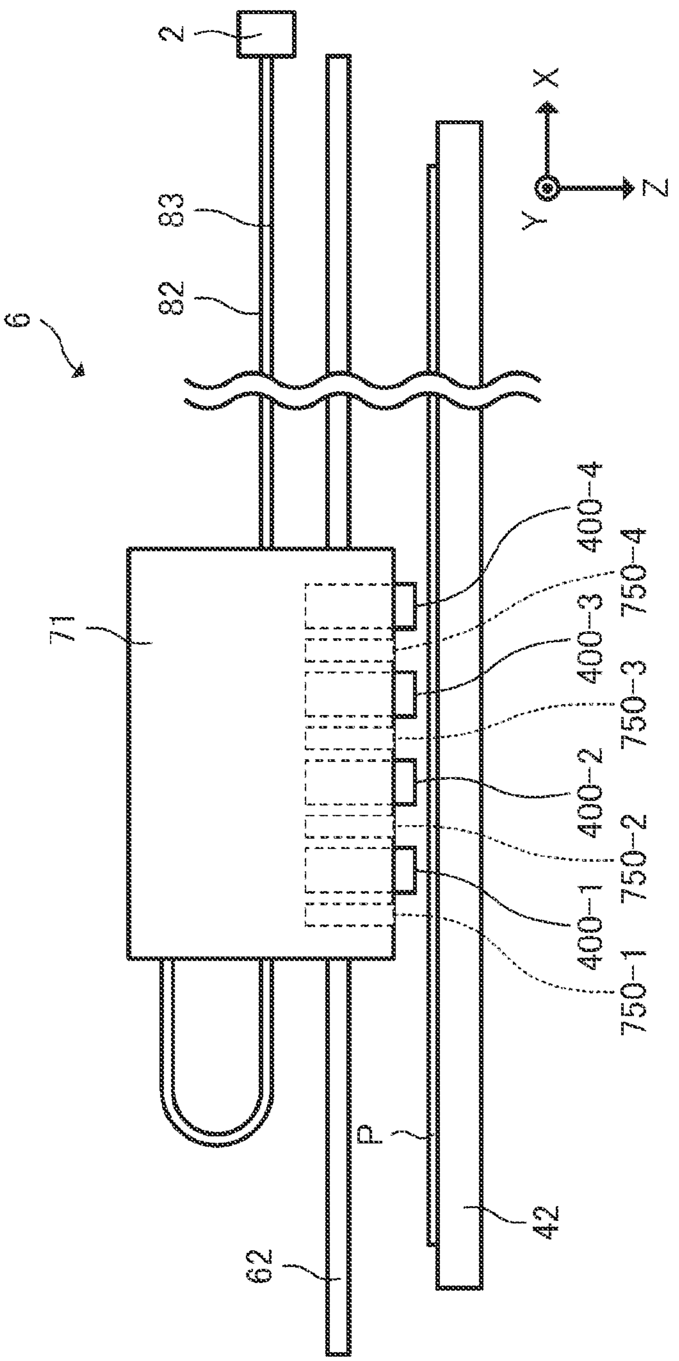
FIG. 11 is a front view illustrating a structure of the printing section of the liquid discharge apparatus.
Figure 12:
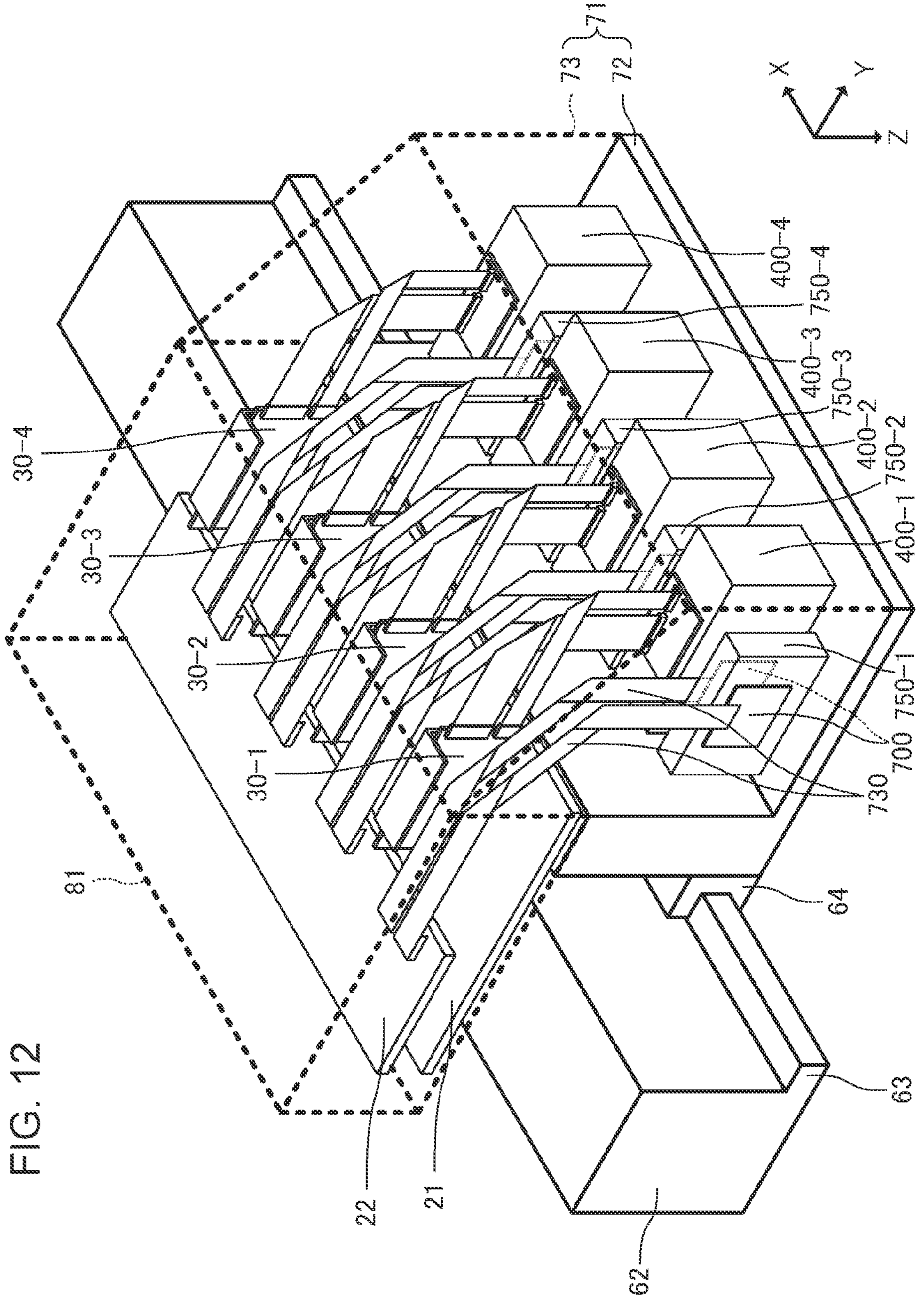
FIG. 12 is a perspective view illustrating a structure of the printing section of the liquid discharge apparatus.

The printing section 6 is positioned on the −Z side of the transport path and discharges ink onto the medium P under the control of the control section 2. Details of the configuration of the printing section 6 will be described. FIG. 10 is a side view illustrating the structure of the printing section 6 of the liquid discharge apparatus 1. FIG. 11 is a front view illustrating the structure of the printing section 6 of the liquid discharge apparatus 1. FIG. 12 is a perspective view illustrating a structure of the printing section 6 of the liquid discharge apparatus 1. As illustrated in FIGS. 10, 11, and 12, the printing section 6 has a carriage 71, a moving mechanism 61, a guide member 62, and a housing 81.

The carriage 71 has a carriage main body 72 and a carriage cover 73. The carriage main body 72 has a substantially L-shaped cross section when the carriage 71 is viewed in the X direction. The carriage cover 73 is attachably and detachably provided in the carriage main body 72. A closed space is formed in the carriage 71 by attaching the carriage cover 73 to the carriage main body 72. The carriage 71 is provided to be capable of reciprocating in the X direction in a state where the +Z side surface of the carriage main body 72 having a substantially L shape faces the medium P.

In the closed space of the carriage 71 configured with the carriage main body 72 and the carriage cover 73, the liquid discharge heads 400-1 to 400-4 and ink sub tanks 750-1 to 750-4 are provided.

The liquid discharge head 400 is mounted on the carriage 71 such that the p nozzles 651 are positioned side by side in the Y direction and the nozzles 651 are exposed from the +Z side of the carriage main body 72. The liquid discharge heads 400-1 to 400-4 are positioned side by side in the order of the liquid discharge heads 400-1, 400-2, 400-3, and 400-4 from the −X side to the +X side in the X direction. The number of liquid discharge heads 400 included in the liquid discharge apparatus 1 is not limited to four.

The ink sub tanks 750-1 to 750-4 temporarily store ink supplied to the printing section 6 from an ink container (not illustrated) included in the liquid discharge apparatus 1. The ink sub tanks 750-1 to 750-4 are provided according to the color of ink used in the liquid discharge apparatus 1, for example. The ink stored in the ink sub tanks 750-1 to 750-4 is supplied to the corresponding liquid discharge head 400 and discharged from the p discharge sections 600 included in the liquid discharge head 400. Here, in the liquid discharge apparatus 1 of the present embodiment, it is described that the ink sub tank 750-1 corresponds to the liquid discharge head 400-1, the ink sub tank 750-2 corresponds to the liquid discharge head 400-2, the ink sub tank 750-3 corresponds to the liquid discharge head 400-3, and the ink sub tank 750-4 corresponds to the liquid discharge head 400-4. That is, the ink stored in the ink sub tank 750-1 is supplied to the liquid discharge head 400-1 and discharged from the p discharge sections 600 included in the liquid discharge head 400-1, the ink stored in the ink sub tank 750-2 is supplied to the liquid discharge head 400-2 and discharged from the p discharge sections 600 included in the liquid discharge head 400-2, the ink stored in the ink sub tank 750-3 is supplied to the liquid discharge head 400-3 and discharged from the p discharge sections 600 included in the liquid discharge head 400-3, and the ink stored in the ink sub tank 750-4 is supplied to the liquid discharge head 400-4 and discharged from the p discharge sections 600 included in the liquid discharge head 400-4.

The ink sub tanks 750-1 to 750-4 are preferably disposed in the vicinity of the corresponding liquid discharge head 400. In the liquid discharge apparatus 1 of the present embodiment, the ink sub tank 750-1 is disposed in the vicinity of the liquid discharge head 400-1 and on the −X side of the liquid discharge head 400-1, the ink sub tank 750-2 is disposed in the vicinity of the liquid discharge head 400-2, on the +X side of the liquid discharge head 400-1, and on the −X side of the liquid discharge head 400-2, the ink sub tank 750-3 is disposed in the vicinity of the liquid discharge head 400-3, on the +X side of the liquid discharge head 400-2, and on the −X side of the liquid discharge head

400-3, and the ink sub tank 750-4 is disposed in the vicinity of the liquid discharge head 400-4, on the +X side of the liquid discharge head 400-3, and on the −X side of the liquid discharge head 400-4.

Here, the ink sub tanks 750-1 to 750-4 all have the same configuration, and may be simply referred to as the ink sub tank 750 when there is no need to distinguish between the ink sub tanks. Further, the number of ink sub tanks 750 included in the liquid discharge apparatus 1 is not limited to four, but may be three or less or five or more according to the number of colors of ink used in the liquid discharge apparatus 1 and the amount of ink used. Furthermore, in the liquid discharge apparatus 1 of the present embodiment, it is described that the ink sub tanks 750 and the liquid discharge heads 400 correspond to each other one-to-one, but one ink sub tank 750 may supply ink to the plurality of liquid discharge heads 400, and the plurality of ink sub tanks 750 may supply ink to the one liquid discharge head 400.

The ink heating sections 700 are attached to the +X side surface and −X side surface of each of the ink sub tanks 750. That is, the liquid discharge apparatus 1 of the present embodiment has eight ink heating sections 700 that correspond to the ink sub tanks 750-1 to 750-4. As described above, the heating section 710 included in the ink heating section 700 generates heat by the heating current Ihc based on the voltage signal VHC output by the power supply circuit 101. The temperature detection section 720 included in the ink heating section 700 detects the temperature of the heating section 710, and the temperature control circuit 500 controls supply of the heating current Ihc to the heating section 710 according to the detection result. Accordingly, the temperature of the heating section 710 of the ink heating section 700 is controlled, and as a result, the temperature of the ink stored in the ink sub tank 750 to which the ink heating section 700 is attached is controlled.

Here, in the following description, it is described that the ink heating section 700 attached to the −X side surface of the ink sub tank 750-1 corresponds to the ink heating section 700-1 described above, the ink heating section 700 attached to the +X side surface of the ink sub tank 750-1 corresponds to the ink heating section 700-2 described above, the ink heating section 700 attached to the −X side surface of the ink sub tank 750-2 corresponds to the ink heating section 700-3 described above, the ink heating section 700 attached to the +X side surface of the ink sub tank 750-2 corresponds to the ink heating section 700-4 described above, the ink heating section 700 attached to the −X side surface of the ink sub tank 750-3 corresponds to the ink heating section 700-5 described above, the ink heating section 700 attached to the +X side surface of the ink sub tank 750-3 corresponds to the ink heating section 700-6 described above, the ink heating section 700 attached to the −X side surface of the ink sub tank 750-4 corresponds to the ink heating section 700-7 described above, and the ink heating section 700 attached to the +X side surface of the ink sub tank 750-4 corresponds to the ink heating section 700-8 described above. In addition, the number of ink heating sections 700 attached to the ink sub tank 750 is not limited to two, and may be one or three or more. Furthermore, the ink heating section 700 may be attached to the side surfaces of the ink sub tank 750 on the +Y side, the −Y side, the −Z side, and the +Z side.

The guide member 62 extends in the X direction and supports the carriage 71 to be capable of reciprocating in the X direction. Specifically, the guide member 62 has a guide rail section 63 extending in the X direction on the lower side surface on the +Y side. Further, the carriage main body 72 included in the carriage 71 has a carriage support section 64 at the lower side surface on the −Y side. By slidably fitting the carriage support section 64 to the guide rail section 63, the carriage 71 is slidably supported by the guide member 62.

The moving mechanism 61 includes a motor (not illustrated). The moving mechanism 61 controls forward and reverse rotation of the motor under the control of the control section 2. The moving mechanism 61 converts the rotational force generated by forward rotation and reverse rotation of the motor into a moving force in the X direction of the carriage 71. Accordingly, the carriage 71 reciprocates in the X direction.

A housing 81 includes a substantially rectangular parallelepiped closed space. The closed space of the housing 81 accommodates a discharge control substrate 21, a heating control substrate 22, and drive circuit substrates 30-1 to 30-4. The end portion on the +Y side of the housing 81 is fixed to the end portion on the −Y side of the carriage main body 72. That is, the discharge control substrate 21, the heating control substrate 22, and the drive circuit substrates 30-1 to 30-4 are mounted on the carriage 71 via the housing 81. In addition, the closed space of the housing 81 is not limited to a completely sealed space, and may be a space with an opening in part, or a space that can be opened and closed in part.

On the discharge control substrate 21, the discharge control circuit 200 described above is mounted, and a connector 28 is provided. One or a plurality of cables 82 are coupled to the connector 28 for electrically coupling the control section 2 and the discharge control substrate 21. As a result, the transmission signal Tx output by the main control circuit 100 included in the control unit 10 included in the control section 2 is input to the discharge control circuit 200 mounted on the discharge control substrate 21.

The drive circuit substrates 30-1 to 30-4 are arranged side by side in the X direction while standing on the −Z side of the discharge control substrate 21. Specifically, the drive circuit substrates 30-1 to 30-4 are arranged side by side in the order of the drive circuit substrates 30-1, 30-2, 30-3, and 30-4 from the −X side to the +X side in the X direction. The above-described drive circuit 300-1 is mounted on the drive circuit substrate 30-1, the above-described drive circuit 300-2 is mounted on the drive circuit substrate 30-2, the above-described drive circuit 300-3 is mounted on the drive circuit substrate 30-3, and the above-described drive circuit 300-4 is mounted on the drive circuit substrate 30-4. Here, the drive circuit substrates 30-1 to 30-4 all have the same configuration, and may be simply referred to as a drive circuit substrate 30 when there is no need to distinguish between the drive circuit substrates. In addition, it is described that the drive circuit 300 is provided on the drive circuit substrate 30.

The discharge control substrate 21 and the drive circuit substrate 30 are coupled via a connector 24. As the connector 24, for example, a BtoB (board to board) connector that directly couples the discharge control substrate 21 and each of the drive circuit substrates 30-1 to 30-4 can be used. As a result, reference driving signals dA and dB generated by the discharge control circuit 200 mounted on the discharge control substrate 21 are input to the drive circuit 300 mounted on the drive circuit substrate 30.

Connectors 84 and 85 are provided at the end portion on the +Y side of the drive circuit substrate 30. In addition, a coupling substrate 74 is positioned on the −Z side of the liquid discharge head 400, connectors 76 and 77 are provided on the −Z side surface of the coupling substrate 74, and a connector 75 is provided on the +Z side surface of the coupling substrate 74. One end of the cable 86 is coupled to the connector 84 included in the drive circuit substrate 30, the other end of the cable 86 is coupled to the connector 76 provided on the coupling substrate 74, one end of the cable 87 is coupled to the connector 85 included in the drive circuit substrate 30, and the other end of the cable 87 is coupled to the connector 77 provided on the coupling substrate 74. Furthermore, the coupling substrate 74 is electrically coupled to the liquid discharge head 400 via the connector 75. That is, the drive circuit substrate 30 and the liquid discharge head 400 are electrically coupled via the cables 86 and 87, the coupling substrate 74, and the connector 75. As a result, the driving signals COMA and COMB output by the drive circuit 300 provided on the drive circuit substrate 30 and the reference voltage signal VBS are supplied to the liquid discharge head 400.

In the liquid discharge apparatus 1 of the present embodiment, the clock signal SCK, the latch signal LAT, the change signal CH, and the print data signal SI, which are output by the discharge control circuit 200 mounted on the discharge control substrate 21, are also input to the drive circuit substrate 30 via the connector 24. In addition, the clock signal SCK, the latch signal LAT, the change signal CH, and the print data signal SI, which are input to the drive circuit substrate 30, propagate through wiring patterns (not illustrated) and the cables 86 and 87 provided on the drive circuit substrate 30 and are input to the liquid discharge head 400. That is, the drive circuit substrate 30 also functions as a relay substrate for propagating the clock signal SCK, the latch signal LAT, the change signal CH, and the print data signal SI to the liquid discharge head 400.

In this case, the driving signals COMA and COMB and the reference voltage signal VBS are high voltage signals capable of driving the piezoelectric element 60, while the clock signal SCK, the latch signal LAT, the change signal CH, and the print data signal SI are low voltage logic signals. In the liquid discharge apparatus 1 of the present embodiment, the high voltage driving signals COMA and COMB and the reference voltage signal VBS propagate through one of the cables 86 and 87, and the low voltage clock signal SCK, latch signal LAT, change signal CH, and print data signal SI propagate through the other of the cables 86 and 87. Accordingly, the concern that the high voltage driving signals COMA and COMB and the reference voltage signal VBS are superimposed on the low voltage clock signal SCK, latch signal LAT, change signal CH, and print data signal SI is reduced.

Here, in the liquid discharge apparatus 1 of the present embodiment, it is described that the drive circuit substrate 30-1 is provided corresponding to the liquid discharge head 400-1, and the drive circuit substrate 30-2 is provided corresponding to the liquid discharge head 400-2, the drive circuit substrate 30-3 is provided corresponding to the liquid discharge head 400-3, and the drive circuit substrate 30-4 is provided corresponding to the liquid discharge head 400-4. That is, the driving signals COMA1 and COMB1 and the reference voltage signal VBS1, which are output by the drive circuit 300-1 mounted on the drive circuit substrate 30-1, and the clock signal SCK, the latch signal LAT1, the change signal CH1, and the print data signal SI1, which propagate through the drive circuit substrate 30-1, are input to the liquid discharge head 400-1. The driving signals COMA2 and COMB2 and the reference voltage signal VBS2, which are output by the drive circuit 300-2 mounted on the drive circuit substrate 30-2, and the clock signal SCK, the latch signal LAT2, the change signal CH2, and the print data signal SI2, which propagate through the drive circuit substrate 30-2, are input to the liquid discharge head 400-2. The driving signals COMA3 and COMB3 and the reference voltage signal VBS3, which are output by the drive circuit 300-3 mounted on the drive circuit substrate 30-3, and the clock signal SCK, the latch signal LAT3, the change signal CH3, and the print data signal SI3, which propagate through the drive circuit substrate 30-3, are input to the liquid discharge head 400-3. The driving signals COMA4 and COMB4 and the reference voltage signal VBS4, which are output by the drive circuit 300-4 mounted on the drive circuit substrate 30-4, and the clock signal SCK, the latch signal LAT4, the change signal CH4, and the print data signal SI4, which propagate through the drive circuit substrate 30-4, are input to the liquid discharge head 400-4.

Here, the number of drive circuit substrates 30 included in the liquid discharge apparatus 1 is not limited to four, and may be three or less or five or more. Furthermore, in the liquid discharge apparatus 1 of the present embodiment, it is described that the drive circuit substrate 30 and the liquid discharge head 400 correspond to each other one-to-one, but the plurality of signals including the driving signals COMA and COMB, which are output by one drive circuit substrate 30, may be input to the plurality of liquid discharge heads 400, and the plurality of signals including the driving signals COMA and COMB, which are output by the plurality of drive circuit substrates 30, may be input to one liquid discharge head 400.

The heating control substrate 22 is positioned on the −Z side of the discharge control substrate 21 and on the −Y side of the drive circuit substrates 30-1 to 30-4. On the heating control substrate 22, the temperature control circuit 500 described above and the switches SW-1 to SW-8 are mounted, and a connector 29 is provided. One or a plurality of cables 83 are coupled to the connector 29 for electrically coupling the control section 2 and the heating control substrate 22. Thereby, the voltage signal VHC output by the power supply circuit 101 included in the control unit 10 included in the control section 2 is input to the heating control substrate 22 via the cable 83. One ends of eight cables 730 are coupled to the heating control substrate 22. The other ends of each of the eight cables 730 are coupled to ink heating sections 700-1 to 700-8.

The heating control substrate 22 as described above branches the voltage signal VHC input from the power supply circuit 101 correspondingly to the ink heating sections 700-1 to 700-8. In addition, one of the branched voltage signals VHC is supplied to the ink heating section 700-1 via the switch SW-1 and the cable 730, another one of the branched voltage signals VHC is supplied to the ink heating section 700-2 via the switch SW-2 and the cable 730, another one of the branched voltage signals VHC is supplied to ink heating section 700-3 via the switch SW-3 and the cable 730, another one of the branched voltage signals VHC is supplied to ink heating section 700-4 via the switch SW-4 and the cable 730, another one of the branched voltage signals VHC is supplied to ink heating section 700-5 via the switch SW-5 and the cable 730, another one of the branched voltage signals VHC is supplied to ink heating section 700-6 via the switch SW-6 and the cable 730, another one of the branched voltage signals VHC is supplied to ink heating section 700-7 via the switch SW-7 and the cable 730, and another one of the branched voltage signals VHC is supplied to ink heating section 700-8 via the switch SW-8 and the cable 730.

That is, the heating control substrate 22 has a wiring pattern through which the heating current Ihc-1 supplied to the heating section 710 included in the ink heating section

700-1 propagates, a wiring pattern through which a heating current Ihc-2 supplied to the heating section 710 included in the ink heating section 700-2 propagates, a wiring pattern through which a heating current Ihc-3 supplied to the heating section 710 included in the ink heating section 700-3 propagates, a wiring pattern through which a heating current Ihc-4 supplied to the heating section 710 included in the ink heating section 700-4 propagates, a wiring pattern through which a heating current Ihc-5 supplied to the heating section 710 included in the ink heating section 700-5 propagates, a wiring pattern through which a heating current Ihc-6 supplied to the heating section 710 included in the ink heating section 700-6 propagates, a wiring pattern through which a heating current Ihc-7 supplied to the heating section 710 included in the ink heating section 700-7 propagates, and a wiring pattern through which a heating current Ihc-8 supplied to the heating section 710 included in the ink heating section 700-8 propagates.

Each of the heating currents Ihc-1 to Ihc-8 propagated through the heating control substrate 22 propagates through the cables 730 corresponding to each of the ink heating sections 700-1 to 700-8, and is supplied to the heating sections 710 included in each of the ink heating sections 700-1 to 700-8. Here, in the following description, the cable 730 through which the heating current Ihc-1 supplied to the heating section 710 included in the ink heating section 700-1 propagates may be referred to as a cable 730-1, the cable 730 through which the heating current Ihc-2 supplied to the heating section 710 included in the ink heating section 700-2 propagates may be referred to as a cable 730-2, the cable 730 through which the heating current Ihc-3 supplied to the heating section 710 included in the ink heating section 700-3 propagates may be referred to as a cable 730-3, the cable 730 through which the heating current Ihc-4 supplied to the heating section 710 included in the ink heating section 700-4 propagates may be referred to as a cable 730-4, the cable 730 through which the heating current Ihc-5 supplied to the heating section 710 included in the ink heating section 700-5 propagates may be referred to as a cable 730-5, the cable 730 through which the heating current Ihc-6 supplied to the heating section 710 included in the ink heating section 700-6 propagates may be referred to as a cable 730-6, the cable 730 through which the heating current Ihc-7 supplied to the heating section 710 included in the ink heating section 700-7 propagates may be referred to as a cable 730-7, and the cable 730 through which the heating current Ihc-8 supplied to the heating section 710 included in the ink heating section 700-8 propagates may be referred to as a cable 730-8.

In addition, the temperature detection signals Tmp-1 to Tmp-8 indicating temperatures of each of the ink heating sections 700-1 to 700-8 are input to the heating control substrate 22 via the cables 730. The temperature detection signals Tmp-1 to Tmp-8 input to the heating control substrate 22 propagate through the wiring patterns provided in the heating control substrate 22 and are input to the temperature control circuit 500. The temperature control circuit 500 generates the switch control signals Sc-1 to Sc-8 corresponding to each of the input temperature detection signals Tmp-1 to Tmp-8, and outputs the signals to the corresponding switches SW-1 to SW-8. As a result, the amounts of current of the heating currents Ihc-1 to Ihc-8 supplied to each of the ink heating sections 700-1 to 700-8, are controlled, and the temperatures of the heating sections 710 included in each of the ink heating sections 700-1 to 700-8 are controlled. As a result, the temperature of the ink stored in the ink sub tank 750-1 to which the ink heating sections 700-1 and 700-2 are attached, the temperature of the ink stored in the ink sub tank 750-2 to which the ink heating sections 700-3 and 700-4 are attached, the temperature of the ink stored in the ink sub tanks 750-3 to which the ink heating sections 700-5 and 700-6 are attached, and the temperature of the ink stored in the ink sub tank 750-4 to which the ink heating sections 700-7 and 700-8 are attached, are controlled.

The ink used in the liquid discharge apparatus 1 has a certain viscosity from the viewpoint of reducing the concern of bleeding when the ink lands on the medium P. In particular, in the case of a textile printer that uses a cloth or the like as the medium P, there is a high possibility that the ink will bleed when the ink lands on the medium P, and therefore high viscosity ink is used. However, when the viscosity of the ink increases, fine discharge control of the ink becomes difficult, and as a result, there is a concern that the quality of the image formed on the medium P will deteriorate.

In order to solve such a problem, in the liquid discharge apparatus 1 of the present embodiment, the ink supplied to the liquid discharge apparatus 1 is temporarily stored in the ink sub tank 750 provided in the vicinity of the liquid discharge head 400, and the ink heating section 700 controls the temperature of the ink stored in the ink sub tank 750 to control the viscosity of the ink supplied to the liquid discharge head 400. Accordingly, the concern that the discharge accuracy of the ink discharged from the liquid discharge head 400 will deteriorate is reduced, and the concern that the quality of the image formed on the medium P will deteriorate is reduced.

Furthermore, the liquid discharge apparatus 1 may have a circulation path for circulating ink between the ink sub tank 750 of which the temperature of ink is controlled and the liquid discharge head 400 that discharges the ink. Even when the temperature of the ink stored in the ink sub tank 750 is controlled by the ink heating section 700, there is a concern that the temperature of the ink will drop in the supply path that supplies the ink from the ink sub tank 750 to the liquid discharge head 400. In response to such a drop in ink temperature, the liquid discharge apparatus 1 is provided with a circulation path for circulating the ink between the ink sub tank 750 and the liquid discharge head 400, and accordingly, by controlling the temperature of the ink stored in the ink sub tank 750, it is also possible to control the temperature of the ink circulating through the circulation path. Accordingly, the concern that the discharge accuracy of the ink discharged from the liquid discharge head 400 will deteriorate is further reduced, and the concern that the quality of the image formed on the medium P will deteriorate is further reduced.

As described above, the liquid discharge apparatus 1 of the present embodiment is the liquid discharge apparatus 1 that forms an image on the medium P by discharging ink, and includes the liquid discharge heads 400-1 to 400-4 that discharge ink, the ink sub tank 750-1 that supplies ink to the liquid discharge head 400-1, the ink sub tank 750-2 that supplies ink to the liquid discharge head 400-2, the ink sub tank 750-3 that supplies ink to the liquid discharge head 400-3, the ink sub tank 750-4 that supplies ink to the liquid discharge head 400-4, the ink heating sections 700-1 and 700-2 that are attached to the ink sub tank 750-1 and are at least partially in contact with the ink sub tank 750-1, the ink heating sections 700-3 and 700-4 that are attached to the ink sub tank 750-2 and are at least partially in contact with the ink sub tank 750-2, the ink heating sections 700-5 and 700-6 that are attached to the ink sub tank 750-3 and are at least partially in contact with the ink sub tank 750-3, the ink heating sections 700-7 and 700-8 that are attached to the ink sub tank 750-4 and are at least partially in contact with the ink sub tank 750-4, the heating control substrate 22 including wiring patterns through which the heating currents Ihc-1 to Ihc-8 supplied to the heating sections 710 included in each of the ink heating sections 700-1 to 700-8 propagate, and the carriage 71 on which the heating control substrate 22 is mounted and which reciprocates in the X direction intersecting the transport direction F in which the medium P is transported.

In the liquid discharge apparatus 1 configured as described above, the temperature of the ink stored in the ink sub tank 750 is controlled by controlling the temperature of the heating section 710 included in the ink heating section 700 attached to the ink sub tank 750. In this case, by positioning the ink sub tank 750 in the vicinity of the liquid discharge head 400, the temperature of the ink discharged from the liquid discharge head 400 can be controlled. As a result, the viscosity of the ink discharged from the liquid discharge head 400 can be controlled, and as a result, the concern that the discharge accuracy of the ink discharged from the liquid discharge head 400 will deteriorate is reduced. Furthermore, when the liquid discharge apparatus 1 has a circulation path for circulating ink between the ink sub tank 750 and the liquid discharge head 400, the temperature of the ink circulating between the ink sub tank 750 and the liquid discharge head 400 can also be controlled, and the concern that the discharge accuracy of ink discharged from the liquid discharge head 400 will deteriorate is further reduced.

Here, the configuration of the heating control substrate 22 that propagates the heating current Ihc supplied to the heating section 710 included in the ink heating section 700 for controlling the temperature of the ink stored in the ink sub tank 750 will be described. In describing the configuration of the heating control substrate 22, FIGS. 13 to 17 illustrate x, y, and z directions orthogonal to each other. Further, in the following description, the starting point side of the arrow indicating the x direction in the drawing may be referred to as the −x side, and the tip end side thereof may be referred to as the +x side. The starting point side of the arrow indicating the y direction in the drawing may be referred to as the −y side, the tip end side thereof may be referred to as the +y side. The starting point side of the arrow indicating the z direction in the drawing may be referred to as the −z side, and the tip end side thereof may be referred to as the +z side. In addition, in the liquid discharge apparatus 1 of the present embodiment, it is described that each of the x direction, the y direction, and the z direction illustrated in FIGS. 13 to 17 corresponds to each of the X direction, the Y direction, and the Z direction illustrated in FIGS. 9 to 12. In other words, the heating control substrate 22 is provided in the housing 81 such that the x direction illustrated in FIGS. 13 to 17 is positioned in the X direction illustrated in FIGS. 9 to 12, and the y direction illustrated in FIGS. 13 to 17 is positioned in the Y direction illustrated in FIGS. 9 to 12, and the z direction illustrated in FIGS. 13 to 17 is positioned in the Z direction illustrated in FIGS. 9 to 12. In addition, the disposition of the heating control substrate 22 in the accommodation space of the housing 81 is not limited thereto.

Figure 13:
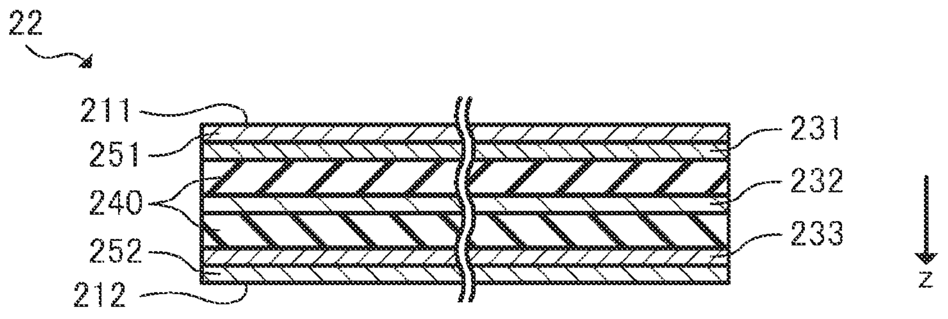
FIG. 13 is a view illustrating an example of a cross-sectional structure of a heating control substrate.

FIG. 13 is a view illustrating an example of a cross-sectional structure of the heating control substrate 22. As illustrated in FIG. 13, the heating control substrate 22 includes a surface 211 and a surface 212 different from the surface 211. The surfaces 211 and 212 are positioned to face each other in the z direction such that the surface 211 is on the −z side and the surface 212 is on the +z side.

The heating control substrate 22 includes layers 231, 232, and 233, a plurality of layers 240, and layers 251 and 252.

The layers 231, 232, and 233 are positioned between the surface 211 and the surface 212, and are positioned in the order of the layer 231, the layer 232, and the layer 233 from the −z side to the +z side in the direction in the z direction. Each of the layers 231, 232, and 233 includes a wiring pattern for propagating a signal input to the heating control substrate 22, a wiring pattern for electrically coupling various electronic components provided on the heating control substrate 22, and the like. Each of these layers 231, 232, and 233 includes a wiring pattern formed of a material having excellent electrical conductivity for propagating various signals, such as copper foil. That is, the layers 231, 232, and 233 correspond to wiring layers provided with wiring patterns for propagating various signals in the heating control substrate 22. In other words, the heating control substrate 22 is positioned between the surface 211 and the surface 212 and has a plurality of wiring layers including the layers 231, 232 and 233 provided with wiring patterns for propagating signals.

The plurality of layers 240 are positioned between the layers 231 and 232 and between the layers 232 and 233 in the z direction. The plurality of layers 240 correspond to insulating layers that insulate the layers 231, 232, and 233 provided with wiring patterns from each other. The plurality of layers 240 are made of a material having excellent insulating properties, and include, for example, epoxy glass or the like formed by impregnating a glass fiber cloth with an epoxy resin. In other words, the heating control substrate 22 has a plurality of insulating layers positioned between the surface 211 and the surface 212 for insulating the layers 231, 232, and 233 provided with the wiring patterns from each other.

The layer 251 is positioned on the −z side of layer 231 and the layer 252 is positioned on the +z side of the layer 233. That is, the layer 251 is positioned to cover the surface on the −z side of the heating control substrate 22, and the layer 252 is positioned to cover the surface on the +z side of the heating control substrate 22. The layers 251 and 252 also function as protective layers that protect the wiring patterns formed on the layers 231 and 233 from the outside of the heating control substrate 22. The layers 251 and 252 are configured to contain, for example, a solder resist or the like. That is, the heating control substrate 22 includes the layer 251 that is positioned to cover the surface on the −z side of the heating control substrate 22, and forms at least a part of the surface 211 of the heating control substrate 22, and the layer 252 that is positioned to cover the surface on the +z side of the heating control substrate 22 and forms at least a part of the surface 212 of the heating control substrate 22.

As described above, the heating control substrate 22 of the present embodiment is a so-called multilayer substrate including the surface 211 and the surface 212 different from the surface 211 and having a plurality of wiring layers between the surface 211 and the surface 212. The number of wiring layers included in the heating control substrate 22 is not limited to the example illustrated in FIG. 13. That is, in addition to the layers 231, 232, and 233, the heating control substrate 22 may include a wiring layer provided with a wiring pattern for propagating a power supply voltage, a wiring layer provided with a wiring pattern for supplying a ground potential, a wiring layer provided with a wiring pattern for propagating other signals, and the like. Here, in the following description, the case where the heating control substrate 22 is viewed from the −z side in the z direction may be referred to as a plan view of the heating control substrate 22.

Figure 14:
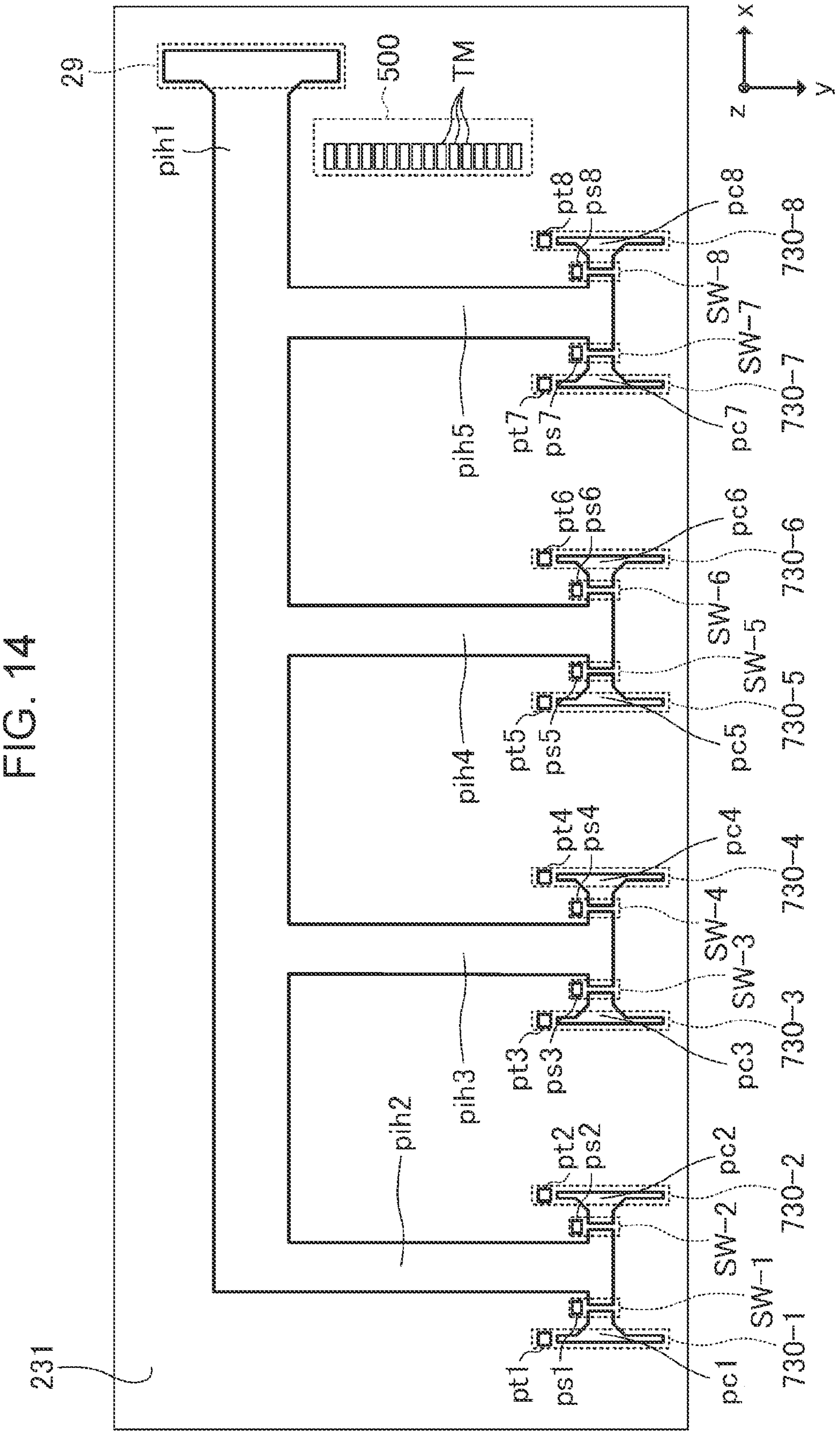
FIG. 14 is a view illustrating an example of wiring patterns provided in a layer.
Figure 15:
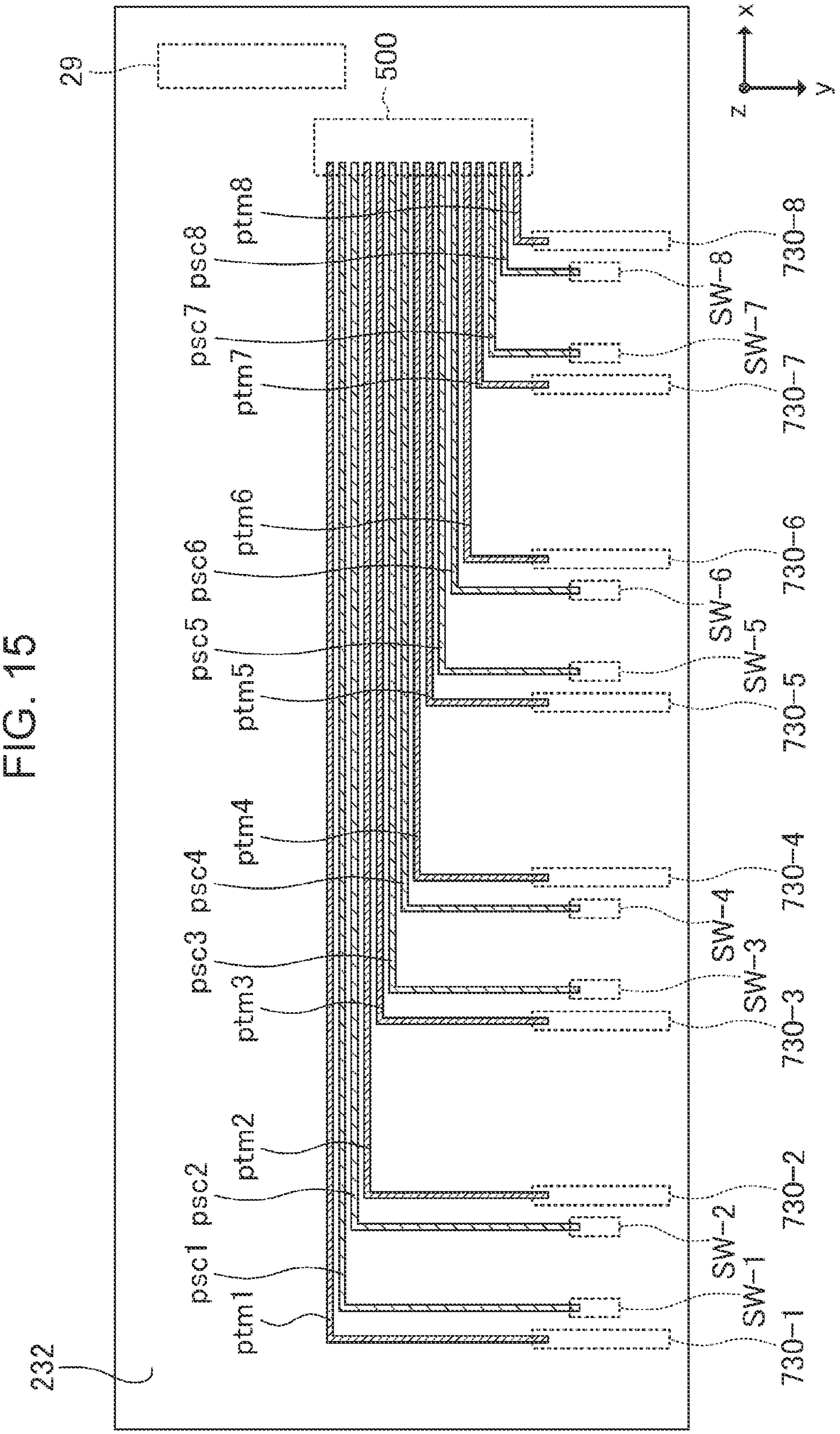
FIG. 15 is a view illustrating an example of wiring patterns provided in a layer.
Figure 16:
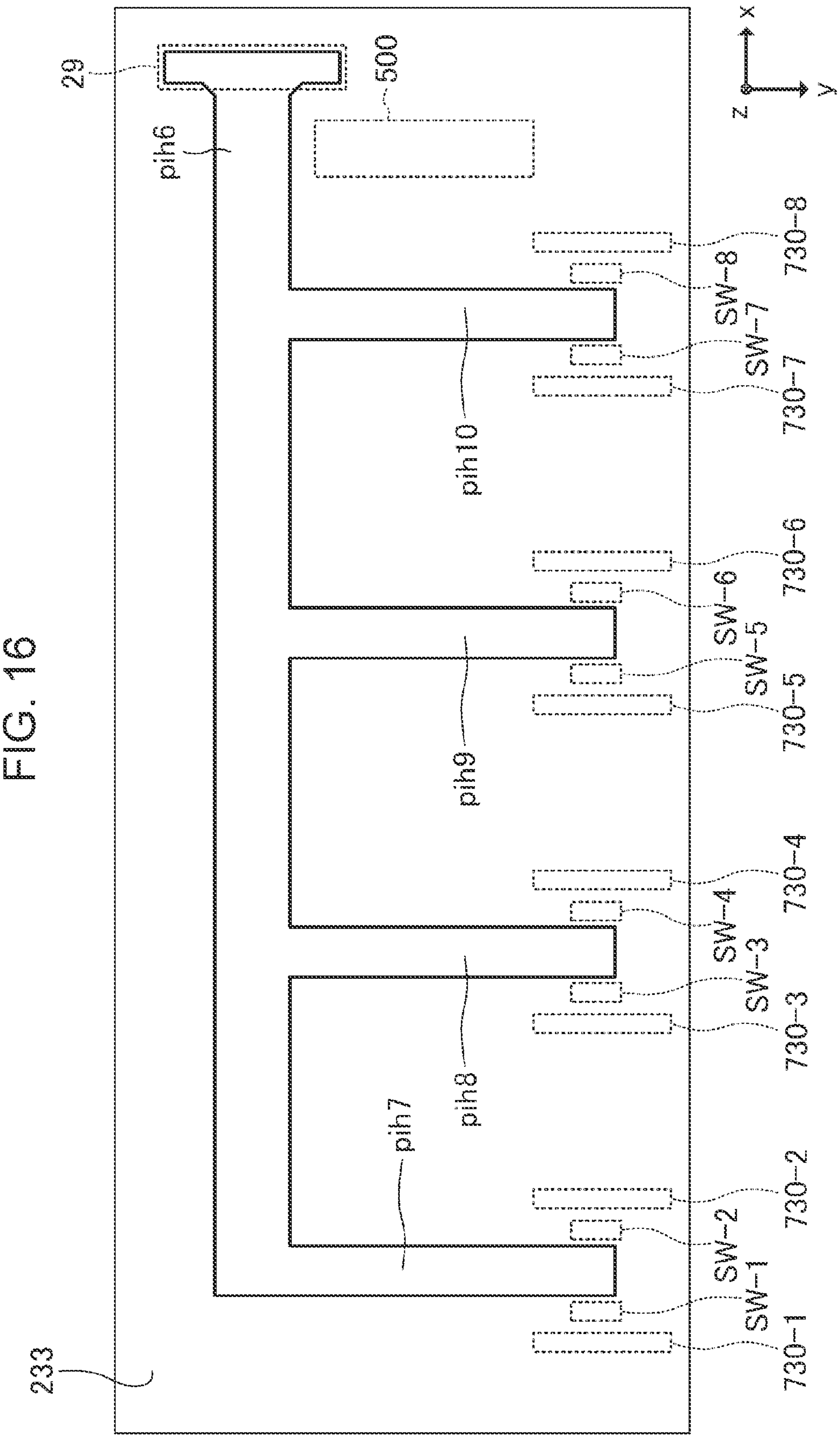
FIG. 16 is a view illustrating an example of wiring patterns provided in a layer.

Next, specific examples of wiring patterns provided in the layers 231 to 233 that correspond to wiring layers will be described. FIG. 14 is a view illustrating an example of the wiring patterns provided in the layer 231. FIG. 15 is a view illustrating an example of the wiring patterns provided in the layer 232. FIG. 16 is a view illustrating an example of the wiring patterns provided in the layer 233. As illustrated in FIGS. 14 to 16, the heating control substrate 22 is a substantially rectangular multilayer substrate including two sides facing each other in the x direction and two sides facing each other in the y direction, and includes wirings pih1 to pih5, wirings pt1 to pt8, wirings ps1 to ps8, wirings pc1 to pc8, and a plurality of wirings TM, which are provided in the layer 231, wirings psc1 to pcs8 and wirings ptm1 to ptm8, which are provided in the layer 232, and wirings pih6 to pih10 provided in the layer 233. In addition, in FIGS. 14 to 16, the connector 29, the temperature control circuit 500, and the switches SW-1 to SW-8, which are mounted on the heating control substrate 22, and one ends of the cables 730-1 to 730-8 attached to the heating control substrate 22 are illustrated by broken lines.

The plurality of wirings TM are electrically coupled to terminals (not illustrated) included in the temperature control circuit 500. As a result, various signals propagating through the heating control substrate 22 are input to the temperature control circuit 500, and various signals output from the temperature control circuit 500 propagate through the heating control substrate 22 toward corresponding components.

The wiring pih1 is a wiring pattern extending in the x direction, and the end portion on the +x side is coupled to the connector 29 via a via or the like.

Each of the wirings pih2 to pih5 is a wiring pattern extending in the y direction, and each end portion on the −y side is coupled to the wiring pih1. Specifically, the wiring pih2 is coupled to the wiring pih1 at the end portion on the −y side, and extends in the y direction toward the +y side. The wiring pih3 is positioned on the +x side of the wiring pih2, is coupled to the wiring pih1 at the end portion on the −y side, and extends toward the +y side in the y direction. The wiring pih4 is positioned on the +x side of the wiring pih3, is coupled to the wiring pih1 at the end portion on the −y side, and extends toward the +y side in the y direction. The wiring pih5 is positioned on the +x side of the wiring pih4, is coupled to the wiring pih1 at the end portion on the −y side, and extends toward the +y side in the y direction. That is, the wirings pih2 to pih5 are arranged side by side to branch off the wiring pih1.

The wiring pc1 is positioned on the −x side of the end portion on the +y side of the wiring pih2, and is electrically coupled to the wiring pih2 via the switch SW-1. The wiring pc2 is positioned on the +x side of the end portion on the +y side of the wiring pih2, and is electrically coupled to the wiring pih2 via the switch SW-2. That is, one end of the switch SW-1 and one end of the switch SW-2 are coupled to the end portion on the +y side of the wiring pih2, the other end of the switch SW-1 is coupled to the wiring pc1, and the other end of the switch SW-2 is coupled to the wiring pc2. In addition, one end of the cable 730-1 is coupled to the wiring pc1, and one end of the cable 730-2 is coupled to the wiring pc2.

The wiring pc3 is positioned on the −x side of the end portion on the +y side of the wiring pih3, and is electrically coupled to the wiring pih3 via the switch SW-3. The wiring pc4 is positioned on the +x side of the end portion on the +y side of the wiring pih3, and is electrically coupled to the wiring pih3 via the switch SW-4. That is, one end of the switch SW-3 and one end of the switch SW-4 are coupled to the end portion on the +y side of the wiring pih3, the other end of the switch SW-3 is coupled to the wiring pc3, and the other end of the switch SW-4 is coupled to the wiring pc4. In addition, one end of the cable 730-3 is coupled to the wiring pc3, and one end of the cable 730-4 is coupled to the wiring pc4.

The wiring pc5 is positioned on the −x side of the end portion on the +y side of the wiring pih4, and is electrically coupled to the wiring pih4 via the switch SW-5. The wiring pc6 is positioned on the +x side of the end portion on the +y side of the wiring pih4, and is electrically coupled to the wiring pih4 via the switch SW-6. That is, one end of the switch SW-5 and one end of the switch SW-6 are coupled to the end portion on the +y side of the wiring pih4, the other end of the switch SW-5 is coupled to the wiring pc5, and the other end of the switch SW-6 is coupled to the wiring pc6. In addition, one end of the cable 730-5 is coupled to the wiring pc5, and one end of the cable 730-6 is coupled to the wiring pc6.

The wiring pc7 is positioned on the −x side of the end portion on the +y side of the wiring pih5, and is electrically coupled to the wiring pih5 via the switch SW-7. The wiring pc8 is positioned on the +x side of the end portion on the +y side of the wiring pih5, and is electrically coupled to the wiring pih5 via the switch SW-8. That is, one end of the switch SW-7 and one end of the switch SW-8 are coupled to the end portion on the +y side of the wiring pih5, the other end of the switch SW-7 is coupled to the wiring pc7, and the other end of the switch SW-8 is coupled to the wiring pc8. In addition, one end of the cable 730-7 is coupled to the wiring pc7, and one end of the cable 730-8 is coupled to the wiring pc8.

Here, one end of each of the cables 730-1 to 730-8 may be coupled to the heating control substrate 22 via a connector (not illustrated), or may be directly coupled to the heating control substrate 22 by soldering or the like.

The switch SW-1 is also coupled to the wiring ps1. The wiring ps1 is coupled to one end of the wiring psc1 provided in the layer 232 via a via (not illustrated) or the like. The other end of the wiring psc1 is coupled to at least one of the plurality of wirings TM provided in the layer 231 via vias (not illustrated) or the like. That is, the switch SW-1 and the temperature control circuit 500 are electrically coupled via the wiring pcs1.

The switch SW-2 is also coupled to the wiring ps2. The wiring ps2 is coupled to one end of the wiring psc2 provided in the layer 232 via a via (not illustrated) or the like. The other end of the wiring psc2 is coupled to at least one of the plurality of wirings TM provided in the layer 231 via vias (not illustrated) or the like. That is, the switch SW-2 and the temperature control circuit 500 are electrically coupled via the wiring pcs2.

The switch SW-3 is also coupled to the wiring ps3. The wiring ps3 is coupled to one end of the wiring psc3 provided in the layer 232 via a via (not illustrated) or the like. The other end of the wiring psc3 is coupled to at least one of the plurality of wirings TM provided in the layer 231 via vias (not illustrated) or the like. That is, the switch SW-3 and the temperature control circuit 500 are electrically coupled via the wiring pcs3.

The switch SW-4 is also coupled to the wiring ps4. The wiring ps4 is coupled to one end of the wiring psc4 provided in the layer 232 via a via (not illustrated) or the like. The other end of the wiring psc4 is coupled to at least one of the plurality of wirings TM provided in the layer 231 via vias (not illustrated) or the like. That is, the switch SW-4 and the temperature control circuit 500 are electrically coupled via the wiring pcs4.

The switch SW-5 is also coupled to the wiring ps5. The wiring ps5 is coupled to one end of the wiring psc5 provided in the layer 232 via a via (not illustrated) or the like. The other end of the wiring psc5 is coupled to at least one of the plurality of wirings TM provided in the layer 231 via vias (not illustrated) or the like. That is, the switch SW-5 and the temperature control circuit 500 are electrically coupled via the wiring pcs5.

The switch SW-6 is also coupled to the wiring ps6. The wiring ps6 is coupled to one end of the wiring psc6 provided in the layer 232 via a via (not illustrated) or the like. The other end of the wiring psc6 is coupled to at least one of the plurality of wirings TM provided in the layer 231 via vias (not illustrated) or the like. That is, the switch SW-6 and the temperature control circuit 500 are electrically coupled via the wiring pcs6.

The switch SW-7 is also coupled to the wiring ps7. The wiring ps7 is coupled to one end of the wiring psc7 provided in the layer 232 via a via (not illustrated) or the like. The other end of the wiring psc7 is coupled to at least one of the plurality of wirings TM provided in the layer 231 via vias (not illustrated) or the like. That is, the switch SW-7 and the temperature control circuit 500 are electrically coupled via the wiring pcs7.

The switch SW-8 is also coupled to the wiring ps8. The wiring ps8 is coupled to one end of the wiring psc8 provided in the layer 232 via a via (not illustrated) or the like. The other end of the wiring psc8 is coupled to at least one of the plurality of wirings TM provided in the layer 231 via vias (not illustrated) or the like. That is, the switch SW-8 and the temperature control circuit 500 are electrically coupled via the wiring pcs8.

One end of the cable 730-1 is also coupled to the wiring pt1. The wiring pt1 is coupled to one end of the wiring ptm1 provided in the layer 232 via a via (not illustrated) or the like. The other end of the wiring ptm1 is coupled to at least one of the plurality of wirings TM provided in the layer 231 via vias (not illustrated) or the like. That is, the cable 730-1 and the temperature control circuit 500 are electrically coupled via the wiring ptm1.

One end of the cable 730-2 is also coupled to the wiring pt2. The wiring pt2 is coupled to one end of the wiring ptm2 provided in the layer 232 via a via (not illustrated) or the like. The other end of the wiring ptm2 is coupled to at least one of the plurality of wirings TM provided in the layer 231 via vias (not illustrated) or the like. That is, the cable 730-2 and the temperature control circuit 500 are electrically coupled via the wiring ptm2.

One end of the cable 730-3 is also coupled to the wiring pt3. The wiring pt3 is coupled to one end of the wiring ptm3 provided in the layer 232 via a via (not illustrated) or the like. The other end of the wiring ptm3 is coupled to at least one of the plurality of wirings TM provided in the layer 231 via vias (not illustrated) or the like. That is, the cable 730-3 and the temperature control circuit 500 are electrically coupled via the wiring ptm3.

One end of the cable 730-4 is also coupled to the wiring pt4. The wiring pt4 is coupled to one end of the wiring ptm4 provided in the layer 232 via a via (not illustrated) or the like. The other end of the wiring ptm4 is coupled to at least one of the plurality of wirings TM provided in the layer 231 via vias (not illustrated) or the like. That is, the cable 730-4 and the temperature control circuit 500 are electrically coupled via the wiring ptm4.

One end of the cable 730-5 is also coupled to the wiring pt5. The wiring pt5 is coupled to one end of the wiring ptm5 provided in the layer 232 via a via (not illustrated) or the like. The other end of the wiring ptm5 is coupled to at least one of the plurality of wirings TM provided in the layer 231 via vias (not illustrated) or the like. That is, the cable 730-5 and the temperature control circuit 500 are electrically coupled via the wiring ptm5.

One end of the cable 730-6 is also coupled to the wiring pt6. The wiring pt6 is coupled to one end of the wiring ptm6 provided in the layer 232 via a via (not illustrated) or the like. The other end of the wiring ptm6 is coupled to at least one of the plurality of wirings TM provided in the layer 231 via vias (not illustrated) or the like. That is, the cable 730-6 and the temperature control circuit 500 are electrically coupled via the wiring ptm6.

One end of the cable 730-7 is also coupled to the wiring pt7. The wiring pt7 is coupled to one end of the wiring ptm7 provided in the layer 232 via a via (not illustrated) or the like. The other end of the wiring ptm7 is coupled to at least one of the plurality of wirings TM provided in the layer 231 via vias (not illustrated) or the like. That is, the cable 730-7 and the temperature control circuit 500 are electrically coupled via the wiring ptm7.

One end of the cable 730-8 is also coupled to the wiring pt8. The wiring pt8 is coupled to one end of the wiring ptm8 provided in the layer 232 via a via (not illustrated) or the like. The other end of the wiring ptm8 is coupled to at least one of the plurality of wirings TM provided in the layer 231 via vias (not illustrated) or the like. That is, the cable 730-8 and the temperature control circuit 500 are electrically coupled via the wiring ptm8.

The wiring pih6 is a wiring pattern extending in the x direction, and the end portion on the +x side is coupled to the wiring pih1 provided in the layer 231 via a via or the like. At this time, the wiring pih6 is positioned to be at least partially overlap the wiring pih1 in plan view of the heating control substrate 22.

Each of the wirings pih7 to pih10 is a wiring pattern extending in the y direction, and each end portion on the −y side is coupled to the wiring pih6.

Specifically, the wiring pih7 is coupled to the wiring pih6 at the end portion on the −y side, and extends in the y direction toward the +y side. In addition, the wiring pih7 is coupled to the wiring pih2 provided in the layer 231 via a via or the like at the end portion on the +y side. At this time, the wiring pih7 is positioned to be at least partially overlap the wiring pih2 in plan view of the heating control substrate 22. The wiring pih8 is positioned on the +x side of the wiring pih7, is coupled to the wiring pih6 at the end portion on the −y side, and extends toward the +y side in the y direction. In addition, the wiring pih8 is coupled to the wiring pih3 provided in the layer 231 via a via or the like at the end portion on the +y side. At this time, the wiring pih8 is positioned to be at least partially overlap the wiring pih3 in plan view of the heating control substrate 22. The wiring pih9 is positioned on the +x side of the wiring pih8, is coupled to the wiring pih6 at the end portion on the −y side, and extends toward the +y side in the y direction. In addition, the wiring pih9 is coupled to the wiring pih4 provided in the layer 231 via a via or the like at the end portion on the +y side. At this time, the wiring pih9 is positioned to be at least partially overlap the wiring pih4 in plan view of the heating control substrate 22. The wiring pih10 is positioned on the +x side of the wiring pih9, is coupled to the wiring pih6 at the end portion on the −y side, and extends toward the +y side in the y direction. In addition, the wiring pih10 is coupled to the wiring pih5 provided in the layer 231 via a via or the like at the end portion on the +y side. At this time, the wiring pih10 is positioned to be at least partially overlap the wiring pih5 in plan view of the heating control substrate 22.

That is, the wirings pih1 to pih5 provided in the layer 231 and the wirings pih6 to pih10 provided in the layer 233 are provided electrically in parallel, and are positioned to be at least partially overlap each other in plan view of the heating control substrate 22.

Here, various signals propagating through the heating control substrate 22 and temperature control of the heating sections 710 included in each of the ink heating sections 700-1 to 700-8 will now be described in detail.

The connector 29 to which the voltage signal VHC output by the power supply circuit 101 is input, and the cable 730-1 coupled to the ink heating section 700-1 attached to the ink sub tank 750-1 are electrically coupled to each other via the wiring pih1 and the wiring pih6, which are provided in the layer 231, the wiring pih2 the wiring pih7, which are provided in the layer 233, the switch SW-1, and the wiring pc1. That is, the heating current Ihc-1 in the heating current Ihc based on the voltage signal VHC output by the power supply circuit 101 propagates through the wiring pih1 and the wiring pih6, and the wiring pih2 and the wiring pih7, and is supplied to the heating section 710 included in the ink heating section 700-1 via the switch SW-1, the wiring pc1, and the cable 730-1.

Further, the temperature detection section 720 included in the ink heating section 700-1 detects the temperature of the heating section 710 included in the ink heating section 700-1, generates the temperature detection signal Tmp-1 based on the detected temperature, and outputs the temperature detection signal Tmp-1. The temperature detection signal Tmp-1 output from temperature detection section 720 is input to heating control substrate 22 via the cable 730-1. In addition, the temperature detection signal Tmp-1 propagates through the wiring pt1 and the wiring ptm1 provided in the heating control substrate 22, and is input to the temperature control circuit 500 via the wiring TM.

The temperature control circuit 500 generates and outputs the switch control signal Sc-1 that corresponds to the input temperature detection signal Tmp-1. The switch control signal Sc-1 is input to the heating control substrate 22 via the wiring TM. The switch control signal Sc-1 propagates through the wiring psc1 and the wiring ps1 provided in the heating control substrate 22 and is input to the control terminal of the switch SW-1. Accordingly, the conduction state of the switch SW-1 is controlled, and the amount of the heating current Ihc-1 supplied to the ink heating section 700-1 is controlled. That is, the temperature of the heating section 710 included in the ink heating section 700-1 that generates heat is controlled according to the amount of the heating current Ihc-1.

Similarly, the connector 29 to which the voltage signal VHC output by the power supply circuit 101 is input, and the cable 730-2 coupled to the ink heating section 700-2 attached to the ink sub tank 750-1 are electrically coupled to each other via the wiring pih1 and the wiring pih6, the wiring pih2 the wiring pih7, the switch SW-2, and the wiring pc2. Accordingly, the heating current Ihc-2 propagates through the wiring pih1 and the wiring pih6, and the wiring pih2 and the wiring pih7, and is supplied to the heating section 710 included in the ink heating section 700-2 via the switch SW-2, the wiring pc2, and the cable 730-2. Further, the temperature detection section 720 included in the ink heating section 700-2 outputs a temperature detection signal Tmp-2 based on the temperature of the heating section 710. The temperature detection signal Tmp-2 is input to the heating control substrate 22 via the cable 730-2, then propagates through the wiring pt2 and the wiring ptm2, and is input to the temperature control circuit 500 via the wiring TM. The temperature control circuit 500 outputs the switch control signal Sc-2 that corresponds to the input temperature detection signal Tmp-2. The switch control signal Sc-2 is input to the heating control substrate 22, then propagates through the wiring psc2 and the wiring ps2, and is input to the control terminal of the switch SW-2. Accordingly, the conduction state of the switch SW-2 is controlled, and the amount of the heating current Ihc-2 supplied to the ink heating section 700-2 is controlled. As a result, the temperature of the heating section 710 included in the ink heating section 700-2 that generates heat is controlled according to the amount of the heating current Ihc-2.

Similarly, the connector 29 to which the voltage signal VHC output by the power supply circuit 101 is input, and the cable 730-3 coupled to the ink heating section 700-3 attached to the ink sub tank 750-2 are electrically coupled to each other via the wiring pih1 and the wiring pih6, the wiring pih3 the wiring pih8, the switch SW-3, and the wiring pc3. Accordingly, the heating current Ihc-3 propagates through the wiring pih1 and the wiring pih6, and the wiring pih3 and the wiring pih8, and is supplied to the heating section 710 included in the ink heating section 700-3 via the switch SW-3, the wiring pc3, and the cable 730-3. Further, the temperature detection section 720 included in the ink heating section 700-3 outputs a temperature detection signal Tmp-3 based on the temperature of the heating section 710. The temperature detection signal Tmp-3 is input to the heating control substrate 22 via the cable 730-3, then propagates through the wiring pt3 and the wiring ptm3, and is input to the temperature control circuit 500 via the wiring TM. The temperature control circuit 500 outputs the switch control signal Sc-3 that corresponds to the input temperature detection signal Tmp-3. The switch control signal Sc-3 is input to the heating control substrate 22, then propagates through the wiring psc3 and the wiring ps3, and is input to the control terminal of the switch SW-3. Accordingly, the conduction state of the switch SW-3 is controlled, and the amount of the heating current Ihc-3 supplied to the ink heating section 700-3 is controlled. As a result, the temperature of the heating section 710 included in the ink heating section 700-3 that generates heat is controlled according to the amount of the heating current Ihc-3.

Similarly, the connector 29 to which the voltage signal VHC output by the power supply circuit 101 is input, and the cable 730-4 coupled to the ink heating section 700-4 attached to the ink sub tank 750-2 are electrically coupled to each other via the wiring pih1 and the wiring pih6, the wiring pih3 the wiring pih8, the switch SW-4, and the wiring pc4. Accordingly, the heating current Ihc-4 propagates through the wiring pih1 and the wiring pih6, and the wiring pih3 and the wiring pih8, and is supplied to the heating section 710 included in the ink heating section 700-4 via the switch SW-4, the wiring pc4, and the cable 730-4. Further, the temperature detection section 720 included in the ink heating section 700-4 outputs a temperature detection signal Tmp-4 based on the temperature of the heating section 710. The temperature detection signal Tmp-4 is input to the heating control substrate 22 via the cable 730-4, then propagates through the wiring pt4 and the wiring ptm4, and is input to the temperature control circuit 500 via the wiring TM. The temperature control circuit 500 outputs the switch control signal Sc-4 that corresponds to the input temperature detection signal Tmp-4. The switch control signal Sc-4 is input to the heating control substrate 22, then propagates through the wiring psc4 and the wiring ps4, and is input to the control terminal of the switch SW-4. Accordingly, the conduction state of the switch SW-4 is controlled, and the amount of the heating current Ihc-4 supplied to the ink heating section 700-4 is controlled. As a result, the temperature of the heating section 710 included in the ink heating section 700-4 that generates heat is controlled according to the amount of the heating current Ihc-4.

Similarly, the connector 29 to which the voltage signal VHC output by the power supply circuit 101 is input, and the cable 730-5 coupled to the ink heating section 700-5 attached to the ink sub tank 750-3 are electrically coupled to each other via the wiring pih1 and the wiring pih6, the wiring pih4 the wiring pih9, the switch SW-5, and the wiring pc5. Accordingly, the heating current Ihc-5 propagates through the wiring pih1 and the wiring pih6, and the wiring pih4 and the wiring pih9, and is supplied to the heating section 710 included in the ink heating section 700-5 via the switch SW-5, the wiring pc5, and the cable 730-5. Further, the temperature detection section 720 included in the ink heating section 700-5 outputs a temperature detection signal Tmp-5 based on the temperature of the heating section 710. The temperature detection signal Tmp-5 is input to the heating control substrate 22 via the cable 730-5, then propagates through the wiring pt5 and the wiring ptm5, and is input to the temperature control circuit 500 via the wiring TM. The temperature control circuit 500 outputs the switch control signal Sc-5 that corresponds to the input temperature detection signal Tmp-5. The switch control signal Sc-5 is input to the heating control substrate 22, then propagates through the wiring psc5 and the wiring ps5, and is input to the control terminal of the switch SW-5. Accordingly, the conduction state of the switch SW-5 is controlled, and the amount of the heating current Ihc-5 supplied to the ink heating section 700-5 is controlled. As a result, the temperature of the heating section 710 included in the ink heating section 700-5 that generates heat is controlled according to the amount of the heating current Ihc-5.

Similarly, the connector 29 to which the voltage signal VHC output by the power supply circuit 101 is input, and the cable 730-6 coupled to the ink heating section 700-6 attached to the ink sub tank 750-3 are electrically coupled to each other via the wiring pih1 and the wiring pih6, the wiring pih4 the wiring pih9, the switch SW-6, and the wiring pc6. Accordingly, the heating current Ihc-6 propagates through the wiring pih1 and the wiring pih6, and the wiring pih4 and the wiring pih9, and is supplied to the heating section 710 included in the ink heating section 700-6 via the switch SW-6, the wiring pc6, and the cable 730-6. Further, the temperature detection section 720 included in the ink heating section 700-6 outputs a temperature detection signal Tmp-6 based on the temperature of the heating section 710. The temperature detection signal Tmp-6 is input to the heating control substrate 22 via the cable 730-6, then propagates through the wiring pt6 and the wiring ptm6, and is input to the temperature control circuit 500 via the wiring TM. The temperature control circuit 500 outputs the switch control signal Sc-6 that corresponds to the input temperature detection signal Tmp-6. The switch control signal Sc-6 is input to the heating control substrate 22, then propagates through the wiring psc6 and the wiring ps6, and is input to the control terminal of the switch SW-6. Accordingly, the conduction state of the switch SW-6 is controlled, and the amount of the heating current Ihc-6 supplied to the ink heating section 700-6 is controlled. As a result, the temperature of the heating section 710 included in the ink heating section 700-6 that generates heat is controlled according to the amount of the heating current Ihc-6.

Similarly, the connector 29 to which the voltage signal VHC output by the power supply circuit 101 is input, and the cable 730-7 coupled to the ink heating section 700-7 attached to the ink sub tank 750-4 are electrically coupled to each other via the wiring pih1 and the wiring pih6, the wiring pih5 the wiring pih10, the switch SW-7, and the wiring pc7. Accordingly, the heating current Ihc-7 propagates through the wiring pih1 and the wiring pih6, and the wiring pih5 and the wiring pih10, and is supplied to the heating section 710 included in the ink heating section 700-7 via the switch SW-7, the wiring pc7, and the cable 730-7. Further, the temperature detection section 720 included in the ink heating section 700-7 outputs a temperature detection signal Tmp-7 based on the temperature of the heating section 710. The temperature detection signal Tmp-7 is input to the heating control substrate 22 via the cable 730-7, then propagates through the wiring pt7 and the wiring ptm7, and is input to the temperature control circuit 500 via the wiring TM. The temperature control circuit 500 outputs the switch control signal Sc-7 that corresponds to the input temperature detection signal Tmp-7. The switch control signal Sc-7 is input to the heating control substrate 22, then propagates through the wiring psc7 and the wiring ps7, and is input to the control terminal of the switch SW-7. Accordingly, the conduction state of the switch SW-7 is controlled, and the amount of the heating current Ihc-7 supplied to the ink heating section 700-7 is controlled. As a result, the temperature of the heating section 710 included in the ink heating section 700-7 that generates heat is controlled according to the amount of the heating current Ihc-7.

Similarly, the connector 29 to which the voltage signal VHC output by the power supply circuit 101 is input, and the cable 730-8 coupled to the ink heating section 700-8 attached to the ink sub tank 750-4 are electrically coupled to each other via the wiring pih1 and the wiring pih6, the wiring pih5 the wiring pih10, the switch SW-8, and the wiring pc8. Accordingly, the heating current Ihc-8 propagates through the wiring pih1 and the wiring pih6, and the wiring pih5 and the wiring pih10, and is supplied to the heating section 710 included in the ink heating section 700-8 via the switch SW-8, the wiring pc8, and the cable 730-8. Further, the temperature detection section 720 included in the ink heating section 700-8 outputs a temperature detection signal Tmp-8 based on the temperature of the heating section 710. The temperature detection signal Tmp-8 is input to the heating control substrate 22 via the cable 730-8, then propagates through the wiring pt8 and the wiring ptm8, and is input to the temperature control circuit 500 via the wiring TM. The temperature control circuit 500 outputs the switch control signal Sc-8 that corresponds to the input temperature detection signal Tmp-8. The switch control signal Sc-8 is input to the heating control substrate 22, then propagates through the wiring psc8 and the wiring ps8, and is input to the control terminal of the switch SW-8. Accordingly, the conduction state of the switch SW-8 is controlled, and the amount of the heating current Ihc-8 supplied to the ink heating section 700-8 is controlled. As a result, the temperature of the heating section 710 included in the ink heating section 700-8 that generates heat is controlled according to the amount of the heating current Ihc-8.

Here, as described above, the heating sections 710 of each of the ink heating sections 700-1 to 700-8 generate heat according to the amounts of the supplied heating currents Ihc-1 to Ihc-8. Therefore, a current of several amperes may be supplied to the heating sections 710 included in each of the ink heating sections 700-1 to 700-8 according to the temperature. Therefore, a large current of several amperes may flow through the wirings pih2 to pih5 and the wirings pih7 to pih10 of the heating control substrate 22 through which the heating currents Ihc-1 to Ihc-8 flow, and further, a current of several amperes to several tens of amperes may flow through the wiring pih1 and the wiring pih6 through which the heating current Ihc obtained by adding the heating currents Ihc-1 to Ihc-8 flows.

The heating control substrate 22 through which such a large current flows generates heat by the current values of the heating currents Ihc and Ihc-1 to Ihc-8, the impedances of the wirings pih1 to pih10 through which the heating currents Ihc and Ihc-1 to Ihc-8 flow. In particular, in the liquid discharge apparatus 1 of the present embodiment, the heating currents Ihc and Ihc-1 to Ihc-8 are as large as several amperes to several tens of amperes, and thus the temperature of the heating control substrate 22 becomes high. Therefore, the temperature of the heating control substrate 22 may continue to be high for a certain period of time even after the supply of the heating currents Ihc-1 to Ihc-8 is stopped. That is, even when the power supply to the liquid discharge apparatus 1 is stopped, the heating control substrate 22 may maintain a high temperature state.

Therefore, when there is a concern that an operator will be in contact with the heating control substrate 22, such as during an inspection process performed when manufacturing the liquid discharge apparatus 1 or during maintenance of the liquid discharge apparatus 1, for a certain period of time during which the heat generated in the heating control substrate 22 can be sufficiently released, measures such as suspending the work and waiting are taken. However, when this measure is executed, waiting is performed for a certain period of time regardless of the actual temperature of the heating control substrate 22, and thus, there is a concern that the heating control substrate 22 will wait even when the temperature of the heating control substrate 22 sufficiently decreased. As a result, there is a concern that work efficiency deteriorates, and that work is started even when the temperature of the heating control substrate 22 did not sufficiently decrease.

That is, in the liquid discharge apparatus 1 including the heating section 710 as illustrated in the present embodiment, the temperature of the ink discharged from the liquid discharge head 400 can be controlled by the heating section 710, and thus the ink discharge accuracy can be improved. On the other hand, in the inspection process and maintenance of the liquid discharge apparatus 1, the operator cannot grasp the heat generation state of the heating control substrate 22, which causes a new problem that workability deteriorates and convenience of the liquid discharge apparatus 1 deteriorates. To address this problem, the liquid discharge apparatus 1 of the present embodiment has a notification function for notifying the operator whether or not the temperature of the heating control substrate 22 is high.

Figure 17:
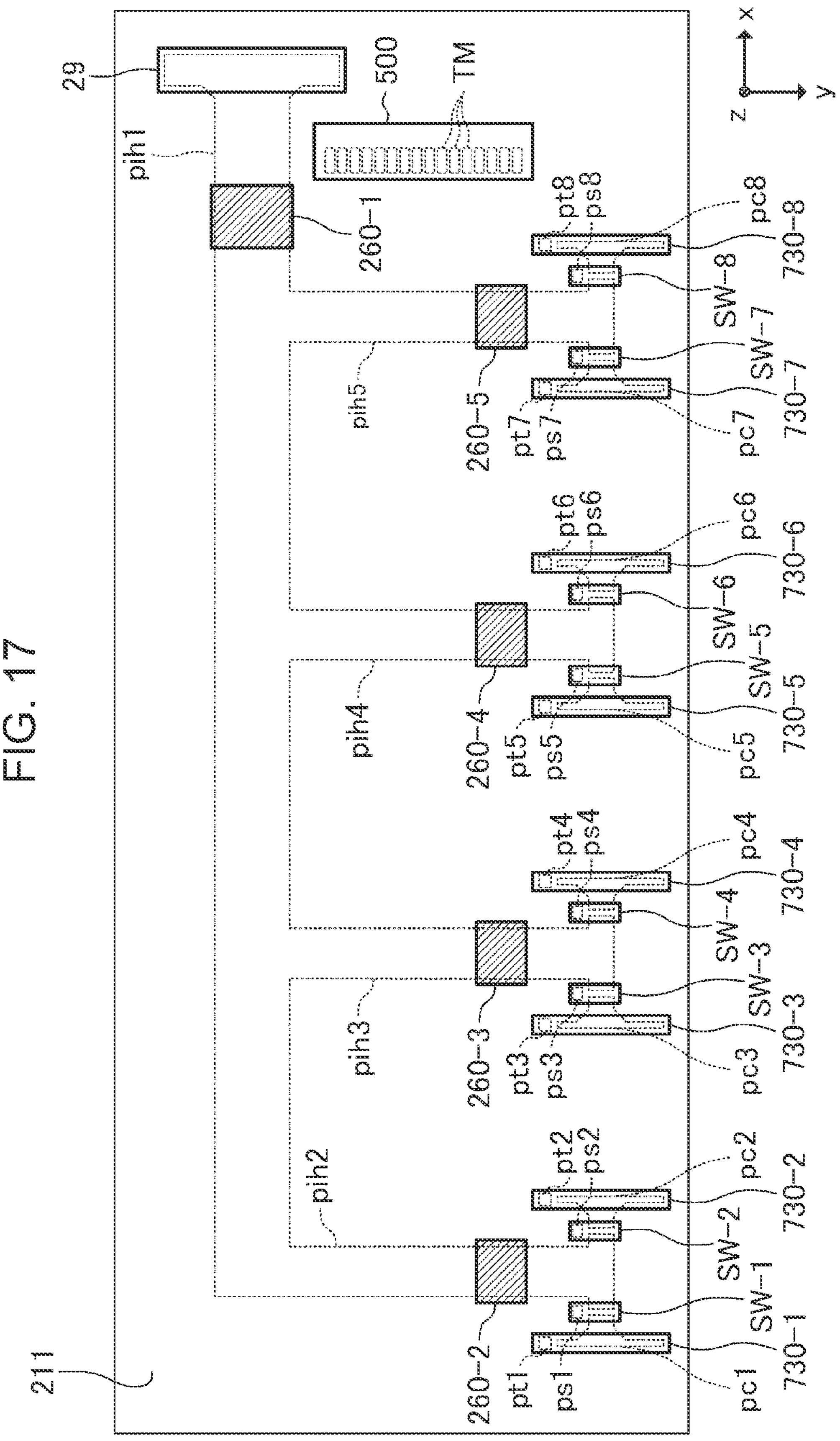
FIG. 17 is a view illustrating an example of a configuration of a surface of the heating control substrate.

An example of a specific configuration of the heating control substrate 22 having such a notification function will be described. FIG. 17 is a view illustrating an example of a configuration of the surface 211 of the heating control substrate 22. As illustrated in FIG. 17, on surface 211 of heating control substrate 22, in addition to the above-described temperature control circuit 500, switches SW-1 to SW-8, connector 29, and cables 730-1 to 730-8, temperature notification sections 260-1 to 260-5 that notifies the temperature of the heating control substrate 22 are provided. That is, the liquid discharge apparatus 1 includes the temperature notification sections 260-1 to 260-5 provided on the surface 211 of the heating control substrate 22. Here, the temperature notification sections 260-1 to 260-5 all have the same configuration, and may be simply referred to as a temperature notification section 260 when there is no need to distinguish between the temperature notification sections. In FIG. 17, the wiring patterns provided in the layer 231 positioned adjacent to the surface 211 is illustrated by broken lines.

The temperature notification section 260 can use, for example, reversible temperature indicating paint. The reversible thermosensitive paint is paint containing a leuco dye that is an electron-donating compound, a developer that is an electron-accepting compound, and a decolorizing agent for controlling the color change temperature range, in which the color of the temperature indicating paint changes from the color in the initial state when the temperature of the temperature indicating paint changes from the initial state where the temperature of the temperature indicating paint is lower than the predetermined threshold temperature to the temperature indication state where the temperature of the temperature indicating paint is equal to or higher than the predetermined threshold temperature, and the color of the temperature indicating paint returns to the color in the initial state when the temperature of the temperature indicating paint changes from the temperature indication state where the temperature of the temperature indicating paint is equal to or higher than the predetermined threshold temperature to the initial state where the temperature of the temperature indicating paint is lower than the predetermined threshold temperature. Here, the color of the temperature indicating paint in the initial state includes, for example, light pink, light green, and white, and the color tone of the temperature indicating paint in the temperature indication state includes purple, bluish purple, black, and the like. The color tone of the temperature indicating paint in the initial state and the color tone in the temperature indication state are not limited thereto, and various colors can be used according to the properties of the leuco dye.

That is, the temperature notification section 260 has an initial state indicating that the temperature of the temperature notification section 260 is lower than a predetermined threshold temperature, a temperature indication state indicating that the temperature of the temperature notification section 260 is equal to or higher than the predetermined threshold temperature, and has different colors in the initial state and the temperature indication state. Further, the initial state and the temperature indication state of the temperature notification section 260 change reversibly depending on whether the temperature of the temperature notification section 260 is lower than a predetermined threshold temperature or the temperature of the temperature notification section 260 is equal to or higher than a predetermined threshold temperature. In other words, the temperature notification section 260 indicates that the temperature of the temperature notification section 260 is lower than the threshold temperature in the initial state, and indicates that the temperature of the temperature notification section 260 is equal to or higher than the threshold temperature in the temperature indication state, and the initial state and the temperature indication state change reversibly.

Accordingly, it is possible to visually notify the operator of the temperature state of the heating control substrate 22. As a result, the operator can easily grasp the heat generation state of the heating control substrate 22, the concern that the workability will significantly deteriorate is reduced, and the concern that the convenience of the liquid discharge apparatus 1 will deteriorate is reduced.

Furthermore, by using the temperature indicating paint as the temperature notification section 260, whether the temperature notification section 260 is in the initial state or the temperature indication state changes according to the temperature of the temperature notification section 260. In other words, the initial state and the temperature indication state change reversibly regardless of whether or not power is supplied to the liquid discharge apparatus 1 including the power supply circuit 101. As a result, even when power is not supplied to the liquid discharge apparatus 1, the operator can easily grasp the heat generation state of the heating control substrate 22, a concern that workability will significantly deteriorate is reduced, and a concern that the convenience of the liquid discharge apparatus 1 will deteriorate is also reduced.

Furthermore, it is preferable that the region in which the temperature notification section 260 is provided in the heating control substrate 22 is a white silk-printed area. Accordingly, the operator can more clearly grasp the change in the color of the temperature indicating paint used as the temperature notification section 260, and as a result, the temperature notification section 260 can more clearly notify the operator of the heat generation state of the heating control substrate 22.

Moreover, the temperature notification section 260 only needs to be capable of changing reversibly whether the temperature notification section 260 is in the initial state or the temperature indication state according to the temperature of the temperature notification section 260. Therefore, the temperature notification section 260 may include a thermoelectric conversion element and a light emitting element that emits light according to the output of the thermoelectric conversion element instead of the temperature indicating paint or in addition to the temperature indicating paint.

In this case, the thermoelectric conversion element included in the temperature notification section 260 outputs electric power corresponding to the temperature detected by the thermoelectric conversion element, and the light emitting element included in the temperature notification section 260 emits light by the electric power according to the temperature detected by the thermoelectric conversion element. That is, the output power output by the thermoelectric conversion element when the temperature of the thermoelectric conversion element is lower than a predetermined threshold temperature, and the output power output by the thermoelectric conversion element when the temperature of the thermoelectric conversion element is equal to or higher than the predetermined threshold temperature, differ from each other. Therefore, the light emission state of the light emitting element that emits light according to the output of the thermoelectric conversion element is also different when the temperature of the thermoelectric conversion element is lower than the predetermined threshold temperature and when the temperature of the thermoelectric conversion element is equal to or higher than the predetermined threshold temperature.

That is, even when the temperature notification section 260 includes a thermoelectric conversion element and a light emitting element that emits light according to the output of the thermoelectric conversion element, the temperature notification section 260 can visually notify the operator of the temperature state of the heating control substrate 22 based on the difference in the light emission state of the light emitting elements in the initial state and the temperature indication state. As a result, the operator can easily grasp the heat generation state of the heating control substrate 22, the concern that the workability will significantly deteriorate is reduced, and the concern that the convenience of the liquid discharge apparatus 1 will deteriorate is reduced.

Further, the predetermined threshold temperature at which the state of the temperature indicating paint used as the temperature notification sections 260-1 to 260-5 changes between the initial state and the temperature indication state is preferably set within a range of 40 degrees to 70 degrees. In other words, it is preferable to use temperature indicating paint that changes between the initial state and the temperature indication state within the range of 40 degrees to 70 degrees as the temperature indicating paint used as temperature notification sections 260-1 to 260-5.

In the case of the liquid discharge apparatus 1 that discharges ink by driving the piezoelectric element 60 as illustrated in the present embodiment, when the temperature of the liquid discharge head 400 becomes high, the stability of the operation of the liquid discharge head 400 may deteriorate. Therefore, when the temperature of the ink supplied to the liquid discharge head 400 becomes high, the concern that the stability of the operation of the liquid discharge head 400 will deteriorate increases. As the temperature indicating paint used as the temperature notification sections 260-1 to 260-5, by using temperature indicating paint that changes between the initial state and the temperature indication state within the range of 40 degrees to 70 degrees, the state of the temperature of the ink supplied to the liquid discharge head 400 can be visually recognized. That is, the temperature notification sections 260-1 to 260-5 can notify the state of the ink supplied to the liquid discharge head 400.

Here, the temperature indicating paint used for each of the temperature notification sections 260-1 to 260-5 may have different properties, the colors in the initial state of each of the temperature notification sections 260-1 to 260-5 may be different, and similarly, the colors in the temperature indication state of each of the temperature notification sections 260-1 to 260-5 may be different.

Next, an example of the disposition of the temperature notification section 260 on the heating control substrate 22 will be described.

The temperature notification section 260-1 is a plan view of the heating control substrate 22, and when viewed from the −z side in the z direction that is the normal direction of the heating control substrate 22, at least a part thereof is positioned to overlap the wiring pih1. In this case, the temperature notification section 260-1 is positioned on the +x side of the coupling point to which one end of the wiring pih5 is coupled among the wirings pih1 extending in the x direction. In other words, the temperature notification section 260-1 is positioned closer to the connector 29 than any of the wirings pih2 to pih5 among the wirings pih1 extending in the x direction. Thereby, the temperature notification section 260-1 detects the temperature of the wiring pih1.

The temperature notification section 260-2 is a plan view of the heating control substrate 22, and when viewed from the −z side in the z direction that is the normal direction of the heating control substrate 22, at least a part thereof is positioned to overlap the wiring pih2. Thereby, the temperature notification section 260-2 detects the temperature of the wiring pih2. In addition, the temperature notification section 260-3 is a plan view of the heating control substrate 22, and when viewed from the −z side in the z direction that is the normal direction of the heating control substrate 22, at least a part thereof is positioned to overlap the wiring pih3. Thereby, the temperature notification section 260-3 detects the temperature of the wiring pih3. In addition, the temperature notification section 260-4 is a plan view of the heating control substrate 22, and when viewed from the −z side in the z direction that is the normal direction of the heating control substrate 22, at least a part thereof is positioned to overlap the wiring pih4. Thereby, the temperature notification section 260-4 detects the temperature of the wiring pih4. In addition, the temperature notification section 260-5 is a plan view of the heating control substrate 22, and when viewed from the −z side in the z direction that is the normal direction of the heating control substrate 22, at least a part thereof is positioned to overlap the wiring pih5. Thereby, the temperature notification section 260-5 detects the temperature of the wiring pih5.

That is, at least a part of the temperature notification section 260-1 is positioned to overlap at least a part of the wiring pih1 provided in the layer 231 positioned closest to the surface 211 among the plurality of wiring layers included in the heating control substrate 22 in the normal direction of the heating control substrate 22, at least a part of the temperature notification section 260-2 is positioned to overlap at least a part of the wiring pih2 provided in the layer 231 positioned closest to the surface 211 among the plurality of wiring layers included in the heating control substrate 22 in the normal direction of the heating control substrate 22, at least a part of the temperature notification section 260-3 is positioned to overlap at least a part of the wiring pih3 provided in the layer 231 positioned closest to the surface 211 among the plurality of wiring layers included in the heating control substrate 22 in the normal direction of the heating control substrate 22, at least a part of the temperature notification section 260-4 is positioned to overlap at least a part of the wiring pih4 provided in the layer 231 positioned closest to the surface 211 among the plurality of wiring layers included in the heating control substrate 22 in the normal direction of the heating control substrate 22, and at least a part of the temperature notification section 260-5 is positioned to overlap at least a part of the wiring pih5 provided in the layer 231 positioned closest to the surface 211 among the plurality of wiring layers included in the heating control substrate 22 in the normal direction of the heating control substrate 22.

In other words, different wiring patterns are not positioned between the temperature notification sections 260-1 to 260-5 and the wirings pih1 to pih5 on which the temperature notification sections 260-1 to 260-5 measure temperatures. As a result, in the heating control substrate 22, the detection accuracy of the temperatures of the wirings pih1 to pih5, which can become particularly high, is improved.

Furthermore, as illustrated in FIG. 17, in the heating control substrate 22, the temperature notification sections 260-2 to 260-5 are preferably positioned side by side in a row in the x direction intersecting the z direction which is the normal direction of the heating control substrate 22. As a result, the visibility of the temperature notification sections 260-2 to 260-5 for grasping the temperature of the heating control substrate 22 is improved.

Here, the liquid discharge head 400-1 is an example of a first discharge head, the ink sub tank 750-1 that supplies ink to the liquid discharge head 400-1 is an example of a first liquid supply section, at least one of the heating section 710 included in the ink heating section 700-1 and the heating section 710 included in the ink heating section 700-2, which are in contact with at least a part of the ink sub tank 750-1, is an example of a first heating element, at least one of the heating current Ihc-1 for heating the heating section 710 included in the ink heating section 700-1 and the heating current Ihc-2 for heating the heating section 710 included in the ink heating section 700-2 is an example of the first drive current, the wiring pih2 through which the heating current Ihc-1 and the heating current Ihc-2 propagate is an example of the first propagation wiring, and the temperature notification section 260-2 provided to overlap the wiring pih2 is an example of the first temperature indicating section. The initial state of temperature notification section 260-2 is an example of a first state, the temperature indication state of temperature notification section 260-2 is an example of a second state, and the threshold temperature that changes between the initial state and the temperature indication state of the temperature notification section 260-2 is an example of a first threshold value.

In addition, the liquid discharge head 400-2 is an example of a second discharge head, the ink sub tank 750-2 that supplies ink to the liquid discharge head 400-2 is an example of a second liquid supply section, at least one of the heating section 710 included in the ink heating section 700-3 and the heating section 710 included in the ink heating section 700-4, which are in contact with at least a part of the ink sub tank 750-2, is an example of a second heating element, at least one of the heating current Ihc-3 for heating the heating section 710 included in the ink heating section 700-3 and the heating current Ihc-4 for heating the heating section 710 included in the ink heating section 700-4 is an example of the second drive current, the wiring pih3 through which the heating current Ihc-3 and the heating current Ihc-4 propagate is an example of the second propagation wiring, and the temperature notification section 260-3 provided to overlap the wiring pih3 is an example of the second temperature indicating section. The initial state of temperature notification section 260-3 is an example of a third state, the temperature indication state of temperature notification section 260-3 is an example of a fourth state, and the threshold temperature that changes between the initial state and the temperature indication state of the temperature notification section 260-3 is an example of a second threshold value.

Further, the temperature notification sections 260-2 to 260-5 provided in the heating control substrate 22 are examples of a plurality of temperature indicating sections, the heating control substrate 22 is an example of a wiring substrate, the power supply circuit 101 that outputs the heating currents Ihc and Ihc-1 to Ihc-8 that propagate through the heating control substrate 22 is an example of a drive current output circuit, the surface 211 of the heating control substrate 22 is an example of a first surface, the surface 212 is an example of a second surface, and the layer 231 positioned closest to the surface 211 among the plurality of wiring layers of the heating control substrate 22 is an example of a propagation wiring layer.

4. Operational Effect

As described above, the liquid discharge apparatus 1 of the present embodiment includes the liquid discharge head 400-1 that discharges ink, the ink sub tank 750-1 that supplies ink to the liquid discharge head 400-1, the heating section 710 included in the ink heating section 700-1 and the heating section 710 included in the ink heating section 700-2, which are at least partially in contact with the ink sub tank 750-1, the heating control substrate 22 including the surface 211, the surface 212 different from the surface 211, and the wiring pih2 through which at least one of the heating current Ihc-1 supplied to the heating section 710 included in the ink heating section 700-1 and the heating current Ihc-2 supplied to the heating section 710 included in the ink heating section 700-2 propagates, and the temperature notification section 260-2 provided on the surface 211.

In addition, in the liquid discharge apparatus 1 of the present embodiment, the temperature notification section 260-2 indicates that the temperature of the temperature notification section 260-2 is lower than the threshold temperature in the initial state, indicates that the temperature of the temperature notification section 260-2 is equal to or higher than the threshold temperature in the temperature indication state, and changes reversibly between the initial state and the temperature indication state. Thereby, the temperature notification section 260-2 can notify whether the detected temperature is a low temperature lower than the threshold temperature or a high temperature equal to or higher than the threshold temperature. Furthermore, the temperature notification section 260-2 is positioned such that at least a part thereof overlaps at least a part of the wiring pih2 in the normal direction of the heating control substrate 22. Thereby, the temperature notification section 260-2 can efficiently detect the temperature of the wiring pih2 that can reach a high temperature in the heating control substrate 22.

That is, in the liquid discharge apparatus 1 of the present embodiment, the temperature notification section 260-2 can efficiently detect the heat generation of the heating control substrate 22 due to the presence of the propagation path through which a large current flows, and the detection result can be notified to the operator. Accordingly, the operator can easily grasp the heat generation state of the heating control substrate 22. As a result, even in the case of the liquid discharge apparatus 1 in which a large current flows because the heating section 710 that heats ink is provided, the concern that the workability will deteriorate in the inspection process in the manufacturing stage or maintenance of the liquid discharge apparatus 1 is reduced, and the concern that the convenience of the liquid discharge apparatus 1 will deteriorate is reduced.

Furthermore, the liquid discharge apparatus 1 of the present embodiment includes the liquid discharge head 400-2 that discharges ink, the ink sub tank 750-2 that supplies ink to the liquid discharge head 400-2, the heating section 710 included in the ink heating section 700-3 and the heating section 710 included in the ink heating section 700-4, which are at least partially in contact with the ink sub tank 750-2, and the temperature notification section 260-3 provided in the surface 211, and the heating control substrate 22 includes the wiring pih3 through which at least one of the heating current Ihc-3 supplied to the heating section 710 included in the ink heating section 700-3 and the heating current Ihc-4 supplied to the heating section 710 included in the ink heating section 700-4 propagate.

In addition, in the liquid discharge apparatus 1 of the present embodiment, the temperature notification section 260-3 indicates that the temperature of the temperature notification section 260-3 is lower than the threshold temperature in the initial state, and indicates that the temperature of the temperature notification section 260-3 is equal to or higher than the threshold temperature in the temperature indication state, changes reversibly between the initial state and the temperature indication state, and is positioned to at least partially overlap at least a part of the wiring pih2 in the normal direction of the heating control substrate 22. Accordingly, even when the liquid discharge apparatus 1 has a plurality of propagation paths through which a large current flows, the heat generation of the heating control substrate 22 can be efficiently detected, and the detection result can be notified to the operator. Accordingly, the operator can easily grasp the heat generation state of the heating control substrate 22, and as a result, even in the case of the liquid discharge apparatus 1 in which a large current flows because the heating section 710 that heats ink is provided, the concern that the workability will deteriorate in the inspection process in the manufacturing stage or maintenance of the liquid discharge apparatus 1 is reduced, and the concern that the convenience of the liquid discharge apparatus 1 will deteriorate is reduced.

As described above, in the liquid discharge apparatus 1 in the present embodiment, the operator can easily grasp the heat generation state of the heating control substrate 22. Therefore, since the liquid discharge apparatus 1 is a textile printer that uses high viscosity ink, even when a large current flows because the heating section 710 that heats ink is provided, the concern that the workability will deteriorate in the inspection process in the manufacturing stage or maintenance of the liquid discharge apparatus 1 is reduced, and the concern that the convenience of the liquid discharge apparatus 1 will deteriorate is reduced.

5. Modification Example

In the liquid discharge apparatus 1 of the present embodiment described above, it is described that each of the temperature notification sections 260-1 to 260-5 provided in the heating control substrate 22 changes between the initial state and the temperature indication state according to the temperature of the temperature notification section 260. However, each of the temperature notification sections 260-1 to 260-5 may have an initial state indicating that the temperature of temperature notification section 260 is lower than a predetermined threshold temperature, a first temperature indication state in the temperature indication state indicating that the temperature of the temperature notification section 260 is equal to or higher than the predetermined threshold temperature, and a second temperature indication state in the temperature indication state indicating that the temperature of the temperature notification section 260 is equal to or higher than a high threshold temperature higher than the predetermined threshold temperature, and have different colors in the initial state, the first temperature indication state, and the second temperature indication state.

Accordingly, it is possible to visually notify the operator of the temperature state of the heating control substrate 22 in detail. As a result, the operator can in more detail and easily grasp the heat generation state of the heating control substrate 22, the concern that the workability will significantly deteriorate is reduced, and the concern that the convenience of the liquid discharge apparatus 1 will deteriorate is reduced.

Here, the second temperature indication state of temperature notification section 260-1 is an example of a fifth state, and the high temperature threshold temperature at which temperature indication section 260-1 changes between the first temperature indication state and the second temperature indication state is an example of a third threshold value.

The embodiments and the modification examples have been described above, but the present disclosure is not limited to the embodiments, and can be implemented in various aspects without departing from the gist thereof. For example, the above-described embodiments can also be appropriately combined with each other.

The present disclosure includes substantially the same configurations (for example, configurations having the same functions, methods, and results, or configurations having the same objects and effects) as the configurations described in the embodiments. Further, the present disclosure includes configurations in which non-essential parts of the configuration described in the embodiments are replaced. In addition, the present disclosure includes configurations that achieve the same operational effects or configurations that can achieve the same objects as those of the configurations described in the embodiment. Further, the present disclosure includes configurations in which a known technology is added to the configurations described in the embodiments.

The following contents are derived from the above-described embodiments and modification examples.

According to an aspect, there is provided a liquid discharge apparatus for forming an image on a medium by discharging a liquid, including: a first discharge head that discharges a liquid; a first liquid supply section that supplies a liquid to the first discharge head; a first heating element that is at least partially in contact with the first liquid supply section; a wiring substrate having a first surface, a second surface different from the first surface, and a first propagation wiring through which a first drive current supplied to the first heating element propagates; and a first temperature indicating section provided in the first surface, in which the first temperature indicating section indicates that a temperature of the first temperature indicating section is lower than a first threshold value in a first state, and indicates that the temperature of the first temperature indicating section is equal to or higher than the first threshold value in a second state, and the first state and the second state change reversibly, and at least a part of the first temperature indicating section overlaps at least a part of the first propagation wiring in a normal direction of the wiring substrate.

According to this liquid discharge apparatus, the first temperature indicating section that indicates that the temperature is lower than the first threshold value in the first state, indicates that the temperature is equal to or higher than the first threshold value in the second state, and changes reversibly between the first state and the second state, is provided, and at least a part of the first temperature indicating section is positioned to overlap at least a part of the first propagation wiring in the normal direction of the wiring substrate. Accordingly, the first temperature indicating section can efficiently detect whether or not the wiring substrate is at a high temperature, and notify the operator of the detection result.

In the liquid discharge apparatus according to the aspect, the first temperature indicating section may have different colors between the first state and the second state.

According to this liquid discharge apparatus, the first temperature indicating section has different colors between the first state and the second state, and accordingly, it is possible to visually notify the operator whether or not the wiring substrate is at a high temperature.

In the liquid discharge apparatus according to the aspect, a carriage that reciprocates along a main scanning direction intersecting a transport direction in which the medium is transported, may further be provided, and the wiring substrate may be mounted on the carriage.

In the liquid discharge apparatus according to the aspect, a drive current output circuit that outputs the first drive current, may further be provided, and the first state and the second state may change reversibly regardless of whether or not power is supplied to the drive current output circuit.

According to this liquid discharge apparatus, the first temperature indicating section can efficiently detect whether or not the wiring substrate is at a high temperature due to residual heat after power supply to the liquid discharge apparatus is stopped.

In the liquid discharge apparatus according to the aspect, the wiring substrate may have a plurality of wiring layers positioned between the first surface and the second surface, the plurality of wiring layers may have a propagation wiring layer in which at least a part of the first propagation wiring is provided, and the propagation wiring layer may be positioned closest to the first surface among the plurality of wiring layers.

According to this liquid discharge apparatus, the efficiency of detecting whether or not the wiring substrate is at a high temperature by the first temperature indicating section is improved.

In the liquid discharge apparatus according to the aspect, at least a part of the first temperature indicating section may overlap at least a part of the first propagation wiring provided in the propagation wiring layer in the normal direction.

According to this liquid discharge apparatus, the efficiency of detecting whether or not the wiring substrate is at a high temperature by the first temperature indicating section is improved.

In the liquid discharge apparatus according to the aspect, a second discharge head that discharges a liquid; a second liquid supply section that supplies a liquid to the second discharge head; a second heating element that is at least partially in contact with the second liquid supply section; and a second temperature indicating section provided in the first surface, may further be provided, the wiring substrate may include a second propagation wiring through which a second drive current supplied to the second heating element propagates, the second temperature indicating section may indicate that a temperature of the second temperature indicating section is lower than a second threshold value in a third state, and indicate that the temperature of the second temperature indicating section is equal to or higher than the second threshold value in a fourth state, and the third state and the fourth state change reversibly, and at least a part of the second temperature indicating section may overlap at least a part of the second propagation wiring in the normal direction.

According to this liquid discharge apparatus, the second temperature indicating section that indicates that the temperature is lower than the second threshold value in the third state, indicates that the temperature is equal to or higher than the second threshold value in the fourth state, and changes reversibly between the third state and the fourth state, is provided, and at least a part of the second temperature indicating section is positioned to overlap at least a part of the second propagation wiring in the normal direction of the wiring substrate. Accordingly, it is possible to efficiently detect whether or not the wiring substrate is at a high temperature over a wide range.

In the liquid discharge apparatus according to the aspect, the wiring substrate may have a plurality of temperature indicating sections including the first temperature indicating section and the second temperature indicating section, and the plurality of temperature indicating sections may be positioned side by side in one row in a direction intersecting the normal direction.

According to this liquid discharge apparatus, it is possible to efficiently notify the operator of the detection result as to whether or not the wiring substrate is at a high temperature.

In the liquid discharge apparatus according to the aspect, the first temperature indicating section may indicate that the temperature of the first propagation wiring is equal to or higher than the first threshold value and is equal to or higher than a third threshold value in a fifth state, and the first temperature indicating section may have different colors in the first state, the second state, and the fifth state.

According to this liquid discharge apparatus, the first temperature indicating section has different colors in the first state, the second state, and the third state, and accordingly, it is possible to visually notify the operator whether or not the wiring substrate is at a high temperature by dividing this into multiple stages.

In the liquid discharge apparatus according to the aspect, the liquid discharge apparatus may be a textile printer.

In the liquid discharge apparatus according to the aspect, the first threshold value may be within a range of 40 degrees to 70 degrees.

In the liquid discharge apparatus according to the aspect, the first temperature indicating section may include temperature indicating paint.

In the liquid discharge apparatus according to the aspect, the first temperature indicating section may include a thermoelectric conversion element and a light emitting element.

What is claimed is:

1. A liquid discharge apparatus for forming an image on a medium by discharging a liquid, comprising:

a first discharge head that discharges a liquid;

a first liquid supply section that supplies a liquid to the first discharge head;

a first heating element that is at least partially in contact with the first liquid supply section;

a wiring substrate having a first surface, a second surface different from the first surface, and a first propagation wiring through which a first drive current supplied to the first heating element propagates; and a first temperature indicating section provided in the first surface, wherein the first temperature indicating section indicates that a temperature of the first temperature indicating section is lower than a first threshold value in a first state, and indicates that the temperature of the first temperature indicating section is equal to or higher than the first threshold value in a second state, and the first state and the second state change reversibly, and at least a part of the first temperature indicating section overlaps at least a part of the first propagation wiring in a normal direction of the wiring substrate.

2. The liquid discharge apparatus according to claim 1, wherein the first temperature indicating section has different colors between the first state and the second state.

3. The liquid discharge apparatus according to claim 1, further comprising:

a carriage that reciprocates along a main scanning direction intersecting a transport direction in which the medium is transported, wherein the wiring substrate is mounted on the carriage.

4. The liquid discharge apparatus according to claim 1, further comprising:

a drive current output circuit that outputs the first drive current, wherein the first state and the second state change reversibly regardless of whether or not power is supplied to the drive current output circuit.

5. The liquid discharge apparatus according to claim 1, wherein the wiring substrate has a plurality of wiring layers positioned between the first surface and the second surface, the plurality of wiring layers have a propagation wiring layer in which at least a part of the first propagation wiring is provided, and the propagation wiring layer is positioned closest to the first surface among the plurality of wiring layers.

6. The liquid discharge apparatus according to claim 5, wherein at least a part of the first temperature indicating section overlaps at least a part of the first propagation wiring provided in the propagation wiring layer in the normal direction.

7. The liquid discharge apparatus according to claim 1, further comprising:

a second discharge head that discharges a liquid;

a second liquid supply section that supplies a liquid to the second discharge head;

a second heating element that is at least partially in contact with the second liquid supply section; and a second temperature indicating section provided in the first surface, wherein the wiring substrate includes a second propagation wiring through which a second drive current supplied to the second heating element propagates, the second temperature indicating section indicates that a temperature of the second temperature indicating section is lower than a second threshold value in a third state, and indicates that the temperature of the second temperature indicating section is equal to or higher than the second threshold value in a fourth state, and the third state and the fourth state change reversibly, and at least a part of the second temperature indicating section overlaps at least a part of the second propagation wiring in the normal direction.

8. The liquid discharge apparatus according to claim 7, wherein the wiring substrate has a plurality of temperature indicating sections including the first temperature indicating section and the second temperature indicating section, and the plurality of temperature indicating sections are positioned side by side in one row in a direction intersecting the normal direction.

9. The liquid discharge apparatus according to claim 1, wherein the first temperature indicating section indicates that the temperature of the first propagation wiring is equal to or higher than the first threshold value and is equal to or higher than a third threshold value in a fifth state, and the first temperature indicating section has different colors in the first state, the second state, and the fifth state.

10. The liquid discharge apparatus according to claim 1, wherein the liquid discharge apparatus is a textile printer.

11. The liquid discharge apparatus according to claim 1, wherein the first threshold value is within a range of 40 degrees to 70 degrees.

12. The liquid discharge apparatus according to claim 1, wherein the first temperature indicating section includes temperature indicating paint.

13. The liquid discharge apparatus according to claim 1, wherein the first temperature indicating section includes a thermoelectric conversion element and a light emitting element.

* * * * *